US012262070B2

(12) United States Patent
Hinds et al.

(10) Patent No.: US 12,262,070 B2
(45) Date of Patent: Mar. 25, 2025

(54) REFERENCE OF NEURAL NETWORK MODEL FOR ADAPTATION OF 2D VIDEO FOR STREAMING TO HETEROGENEOUS CLIENT END-POINTS

(71) Applicant: TENCENT AMERICA LLC, Palo Alto, CA (US)

(72) Inventors: Arianne Hinds, Palo Alto, CA (US); Stephan Wenger, Hillsborough, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 18/205,013

(22) Filed: Jun. 2, 2023

(65) Prior Publication Data

US 2023/0319328 A1    Oct. 5, 2023

Related U.S. Application Data

(63) Continuation of application No. 17/407,711, filed on Aug. 20, 2021, now Pat. No. 11,736,748.
(Continued)

(51) Int. Cl.
*H04N 21/235* (2011.01)
*H04N 21/81* (2011.01)

(52) U.S. Cl.
CPC ....... *H04N 21/2356* (2013.01); *H04N 21/816* (2013.01)

(58) Field of Classification Search
None
See application file for complete search history.

(56) References Cited

U.S. PATENT DOCUMENTS 9,922,007 B1 *   3/2018   Jain ................. H04L 67/56
10,582,227 B2 *  3/2020   He .................. H04N 21/2183
(Continued)

FOREIGN PATENT DOCUMENTS

CA    3105461 A1    1/2020
CN    111182350 A   5/2020
(Continued)

OTHER PUBLICATIONS

Extended European Search Report issued Feb. 28, 2023 in European Application No. 21907367.3.
(Continued)

*Primary Examiner* — William J Kim
(74) *Attorney, Agent, or Firm* — Sughrue Mion, PLLC

(57) ABSTRACT

A method of streaming immersive media includes receiving, from a client end-point, a video content request that identifies video content; transmitting, to the client end-point based on the video content request, a profile request; receiving, from the client end-point, at least one neural network model associated with one or more characteristics of the client end-point; ingesting the identified video content in a two-dimensional video format; converting the ingested video content to a three-dimensional video format based on the at least one neural network model such that the ingested video content converted to the three-dimensional video format includes at least one scene interpolated from one or more scenes of the ingested video content in the two-dimensional video format; and streaming the converted video content to the client end-point.

20 Claims, 15 Drawing Sheets

Related U.S. Application Data

(60) Provisional application No. 63/126,188, filed on Dec. 16, 2020.

(56) References Cited

U.S. PATENT DOCUMENTS

| | | | |
|---|---|---|---|
| 2008/0136898 A1* | 6/2008 | Eisenberg | H04N 7/152 |
| | | | 348/E7.083 |
| 2011/0032338 A1 | 2/2011 | Raveendran et al. | |
| 2014/0092259 A1 | 4/2014 | Tsang | |
| 2015/0332117 A1 | 11/2015 | Zhou et al. | |
| 2016/0261665 A1* | 9/2016 | Stockhammer | H04L 65/65 |
| 2016/0359574 A1* | 12/2016 | Lee | H04L 67/51 |
| 2016/0371876 A1 | 12/2016 | McCombe et al. | |
| 2017/0105053 A1 | 4/2017 | Todd | |
| 2019/0026956 A1 | 1/2019 | Gausebeck et al. | |
| 2019/0026958 A1 | 1/2019 | Gausebeck et al. | |
| 2019/0108686 A1* | 4/2019 | Spivack | G06Q 30/0277 |
| 2019/0141340 A1 | 5/2019 | Reddiar et al. | |
| 2019/0246161 A1 | 8/2019 | Lim et al. | |
| 2019/0332942 A1 | 10/2019 | Wang et al. | |
| 2019/0354745 A1 | 11/2019 | Lecerf | |
| 2019/0373322 A1 | 12/2019 | Rojas-Echenique et al. | |
| 2020/0304836 A1 | 9/2020 | Li et al. | |
| 2021/0099701 A1 | 4/2021 | Li et al. | |
| 2021/0297699 A1 | 9/2021 | Iguch et al. | |
| 2021/0352367 A1 | 11/2021 | Choi et al. | |

FOREIGN PATENT DOCUMENTS

| | | | | |
|---|---|---|---|---|
| CN | 112702522 A | | 4/2021 | |
| EP | 2400748 A2 | * | 12/2011 | ..... H04N 21/234327 |
| KR | 10-2020-0083616 A | | 7/2020 | |
| KR | 20220045552 A | * | 4/2022 | |
| WO | WO-0193592 A1 | * | 12/2001 | ..... H04N 21/234318 |
| WO | WO-2015061580 A1 | * | 4/2015 | ............. G06T 1/00 |
| WO | 2019/199637 A1 | | 10/2019 | |
| WO | WO-2019197722 A1 | * | 10/2019 | |
| WO | 2020/055279 A1 | | 3/2020 | |

OTHER PUBLICATIONS

International Search Report issued Nov. 29, 2021 in International Application No. PCT/US2021/048644.

Written Opinion of the International Searching Authority issued Nov. 29, 2021 in International Application No. PCT/US2021/048644.

Korean Office Action issued Feb. 6, 2024 in Application No. 10-2022-7023653.

* cited by examiner

REFERENCE OF NEURAL NETWORK MODEL FOR ADAPTATION OF 2D VIDEO FOR STREAMING TO HETEROGENEOUS CLIENT END-POINTS

CROSS-REFERENCE TO RELATED APPLICATION

This application claims priority from U.S. application Ser. No. 17/407,711, filed Aug. 20, 2021, in the U.S. Patent and Trademark Office, which claims priority to U.S. Provisional Patent Application No. 63/126,188, filed Dec. 16, 2020, in the U.S. Patent and Trademark Office, the entirety of each of which are incorporated by reference herein in their entirety.

FIELD

This disclosure relates generally to field of data processing, and more particularly to video coding.

BACKGROUND

"Immersive Media" generally refers to media that stimulates any or all human sensory systems (visual, auditory, somatosensory, olfactory, and possibly gustatory) to create or enhance the perception of the user being physically present in the experience of the media, i.e., beyond what is distributed over existing commercial networks for timed two-dimensional (2D) video and corresponding audio which is known as "legacy media". Both immersive media and legacy media can be characterized as either timed or untimed.

Timed media refers to media that is structured and presented according to time. Examples include movie features, news reports, episodic content, all of which are organized according to periods of time. Legacy video and audio are generally considered to be timed media.

Untimed media is media that is not structured by time; but rather structured by logical, spatial, and/or temporal relationships. An example includes a video game where the user has control over the experience created by the gaming device. Another example of untimed media is a still image photograph taken by a camera. Untimed media may incorporate timed media, for example, in a continuously looped audio or video segment of a scene for a video game. Conversely, timed media may incorporate untimed media, for example a video with a fixed still image as background.

Immersive media-capable devices may refer to devices equipped with abilities to access, interpret, and present immersive media. Such media and devices are heterogeneous in terms of the quantity and formats of the media, and numbers and types of network resources required to distribute such media at scale, i.e., to achieve distribution equivalent to that of legacy video and audio media over networks. In contrast, legacy devices such as laptop displays, televisions, and mobile handset displays are homogenous in their capabilities since all of these devices are comprised of rectangular display screens, and consume 2D rectangular video or still images as their primary media formats.

SUMMARY

Provided are a method, system, and computer readable medium for streaming immersive media.

According to an aspect of the disclosure, a method of streaming immersive media, executable by a processor, includes ingesting content in a two-dimensional format, wherein the two-dimensional format references at least one neural network; converting the ingested content to a three-dimensional format based on the referenced at least one neural network; and streaming the converted content to a client end-point.

The at least one neural network may include a scene-specific neural network corresponding to a scene included in the ingested content.

The converting of the ingested content may include: inferring depth information about the scene using the scene-specific neural network; and adapting the ingested content into a scene-specific volumetric format associated with the scene.

The at least one neural network may be trained based on priors corresponding to objects within the scene.

The at least one neural network may be referenced in a supplemental enhancement information (SEI) message included in a coded video bitstream corresponding to the ingested content.

A neural network model and at least one parameter corresponding to the at least one neural network may be embedded directly in the SEI message.

A location of a neural network model corresponding to the at least one neural network may be signaled in the SEI message.

The client end-point may include one or more from among a television, a computer, a head-mounted display, a lenticular light field display, a holographic display, an augmented reality display, and a dense light field display.

According to an aspect of the disclosure, a device for streaming immersive media includes at least one memory configured to store program code; and at least one processor configured to read the program code and operate as instructed by the program code, the program code including: ingesting code configured to cause the at least one processor to ingest content in a two-dimensional format, wherein the two-dimensional format references at least one neural network; converting code configured to cause the at least one processor to convert the ingested content to a three-dimensional format based on the referenced at least one neural network; and streaming code configured to cause the at least one processor to stream the converted content to a client end-point.

The at least one neural network may include a scene-specific neural network corresponding to a scene included in the ingested content.

The converting code may include inferring code configured to cause the at least one processor to infer depth information about the scene using the scene-specific neural network; and adapting code configured to cause the at least one processor to adapt the ingested content into a scene-specific volumetric format associated with the scene.

The at least one neural network may be trained based on priors corresponding to objects within the scene.

The at least one neural network may be referenced in a supplemental enhancement information (SEI) message included in a coded video bitstream corresponding to the ingested content.

A neural network model and at least one parameter corresponding to the at least one neural network may be embedded directly in the SEI message.

A location of a neural network model corresponding to the at least one neural network may be signaled in the SEI message.

The client end-point may include one or more from among a television, a computer, a head-mounted display, a lenticular light field display, a holographic display, an augmented reality display, and a dense light field display.

According to an aspect of the disclosure, a non-transitory computer-readable medium storing instructions, the instructions including one or more instructions that, when executed by at least one processor of a device for streaming immersive media, cause the at least one processor to: ingest code configured to cause the at least one processor to ingest content in a two-dimensional format, wherein the two-dimensional format references at least one neural network; convert code configured to cause the at least one processor to convert the ingested content to a three-dimensional format based on the referenced at least one neural network; and stream code configured to cause the at least one processor to stream the converted content to a client end-point.

The at least one neural network may include a scene-specific neural network corresponding to a scene included in the ingested content.

The one or more instructions may further cause the at least one processor to: infer depth information about the scene using the scene-specific neural network; and adapt the ingested content into a scene-specific volumetric format associated with the scene.

The at least one neural network may be referenced in a supplemental enhancement information (SEI) message included in a coded video bitstream corresponding to the ingested content.

BRIEF DESCRIPTION OF THE DRAWINGS

These and other objects, features and advantages will become apparent from the following detailed description of illustrative embodiments, which is to be read in connection with the accompanying drawings. The various features of the drawings are not to scale as the illustrations are for clarity in facilitating the understanding of one skilled in the art in conjunction with the detailed description. In the drawings.

DETAILED DESCRIPTION

Figure 1:
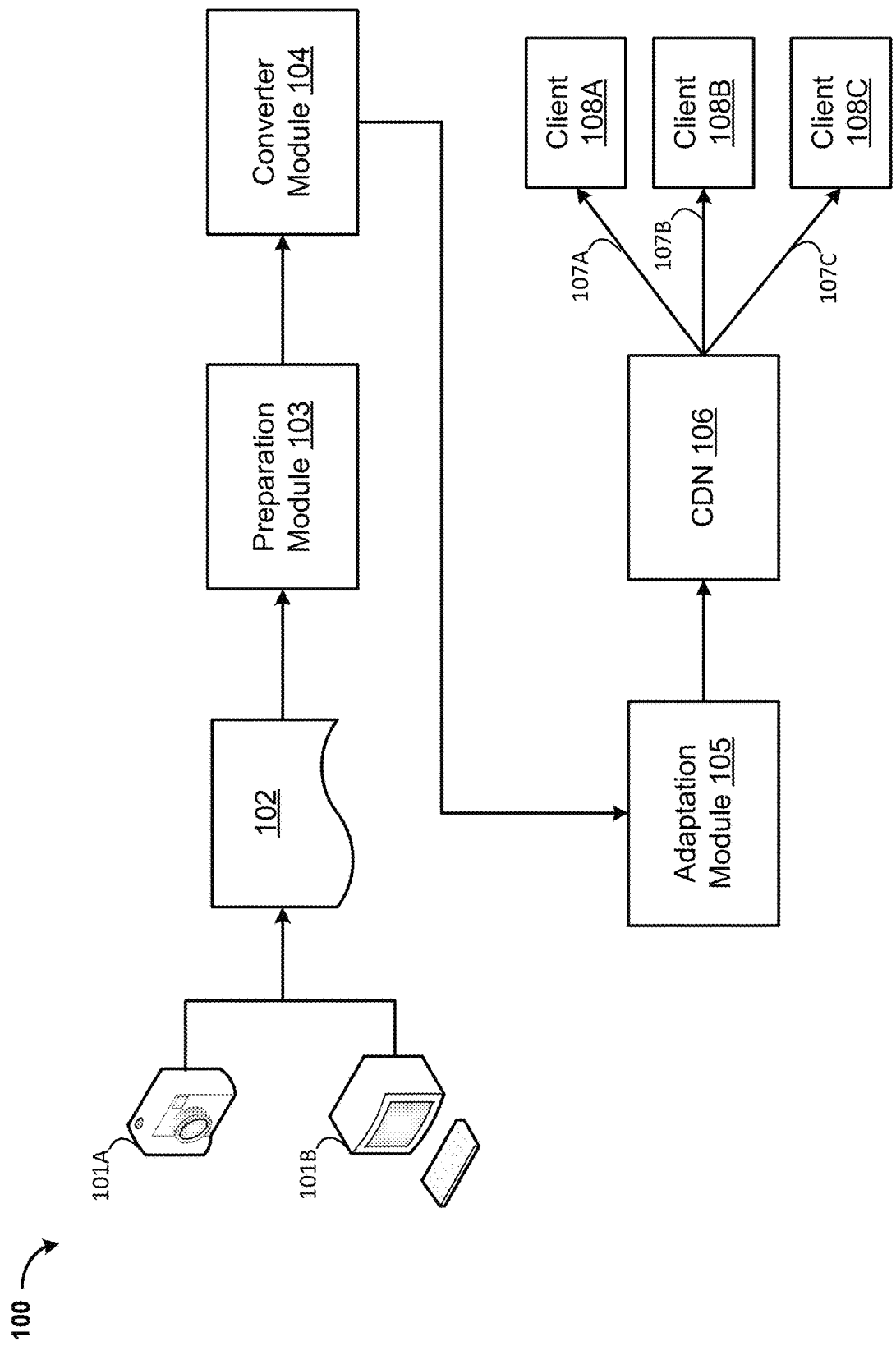
FIG. 1 is a schematic illustration of an end-to-end process of timed legacy media distribution.

Detailed embodiments of the claimed structures and methods are disclosed herein; however, it can be understood that the disclosed embodiments are merely illustrative of the claimed structures and methods that may be embodied in various forms. Those structures and methods may, however, be embodied in many different forms and should not be construed as limited to the exemplary embodiments set forth herein. Rather, these exemplary embodiments are provided so that this disclosure will be thorough and complete and will fully convey the scope to those skilled in the art. In the description, details of well-known features and techniques may be omitted to avoid unnecessarily obscuring the presented embodiments.

Embodiments relate generally to the field of data processing, and more particularly to video coding. The techniques described herein allow for a 2D coded video stream to signal scene-specific neural network models in order for a network to ingest a 2D video source of media including one or more (usually small) number of views and adapt the source of 2D media into one or more streamable "distribution formats" to accommodate a variety of heterogeneous client end-point devices, their differing features and capabilities, and the requirements of the applications being used on the client end-points, prior to actually distributing the formatted media to the variety of client end-points. The network model may be embedded directly into the scene-specific coded video stream of a coded bitstream by means of an SEI structured field, or the SEI may signal the use of a specific model that is stored elsewhere on the distribution network, but available to the neural network process for access. The ability to reformat a 2D media source into a variety of streamable distribution formats enables a network to simultaneously service a variety of client end-points with various capabilities, and available compute resources, and enables the support of emerging immersive client end-points such as holographic, and light field displays in commercial networks. Moreover, the ability to adapt the scene-specific 2D media source based on a scene specific neural network model improves the final visual quality. Such an ability to adapt a 2D media source is especially important when there is no immersive media source that is available, and when the client cannot support a distribution format that is based on 2D media. In this scenario, a neural network-based approach can be more optimally used on specific scenes that exist within the 2D media by carrying scene-specific neural network models that are trained with priors that are generally similar to the objects within the specific scene or the for the context of the specific scene. This improves the network's ability to infer depth-based information about the specific scene so that it can adapt the 2D media into a scene-specific volumetric format suitable for the target client end-point.

As previously described, "Immersive Media" generally refers to media that stimulates any or all human sensory systems (visual, auditory, somatosensory, olfactory, and possibly gustatory) to create or enhance the perception of the user being physically present in the experience of the media, i.e., beyond what is distributed over existing commercial networks for timed two-dimensional (2D) video and corresponding audio which is known as "legacy media". Both immersive media and legacy media can be characterized as either timed or untimed.

Timed media refers to media that is structured and presented according to time. Examples include movie features, news reports, episodic content, all of which are organized according to periods of time. Legacy video and audio are generally considered to be timed media.

Untimed media is media that is not structured by time; but rather structured by logical, spatial, and/or temporal relationships. An example includes a video game where the user has control over the experience created by the gaming device. Another example of untimed media is a still image photograph taken by a camera. Untimed media may incorporate timed media, for example, in a continuously looped audio or video segment of a scene for a video game. Conversely, timed media may incorporate untimed media, for example a video with a fixed still image as background.

Immersive media-capable devices may refer to devices equipped with abilities to access, interpret, and present immersive media. Such media and devices are heterogeneous in terms of the quantity and formats of the media, and numbers and types of network resources required to distribute such media at scale, i.e., to achieve distribution equivalent to that of legacy video and audio media over networks. In contrast, legacy devices such as laptop displays, televisions, and mobile handset displays are homogenous in their capabilities since all of these devices are comprised of rectangular display screens, and consume 2D rectangular video or still images as their primary media formats.

The distribution of any media over networks may employ media delivery systems and architectures that reformat the media from an input or network "ingest" format to a final distribution format where that distribution format is not only suitable for the targeted client device and its applications, but is also conducive to being streamed over the network. "Streaming" of media broadly refers to the fragmenting and packetizing of the source media so that it can be delivered over the network in consecutive smaller-sized "chunks" logically organized and sequenced according to either or both the media's temporal or spatial structure. In such distribution architectures and systems, the media may undergo compression or layering processes so that only the most salient media information is delivered first to the client. In some cases, the client must receive all of the salient media information for some portion of the media before the client is able to present any of the same media portion to the end user.

The process of reformatting an input media to match the capabilities of a target client end-point may employ a neural network process that takes a network model that may encapsulate some prior knowledge of the specific media being reformatted. For example, a specific model may be tuned to recognize outdoor park scenes (with trees, plants, grass, and other objects common to a park scene), whereas yet a different specific model may be tuned to recognize an indoor dinner scene (with a dinner table, serving utensils, persons seated at the table, and so on). Those skilled in the art will recognize that a network model that is tuned to recognize objects from a particular context, e.g., park scene objects, will recognize that a neural network process equipped with a network model that is tuned to match the contents of a specific scene, will produce better visual results than a network model that is not so tuned. Hence, there is a benefit of providing scene-specific network models to a neural network process that is tasked with reformatting the input media to match the capabilities of a target client end-point.

The mechanism to associate a neural network model to a specific scene may be accomplished by optionally compressing the network model and inserting it directly into the coded bitstream for a visual scene by means of a Supplemental Enhancement Information (SEI) structured field commonly used to attach metadata to coded video streams in H.264, H.265, and H.266 video compression formats. The presence of an SEI message containing a specific neural network model within the context of a portion of a coded video bitstream may be used to indicate that the network model is to be used to interpret and adapt the video contents within the portion of the bitstream in which the model is embedded. Alternatively, the SEI message may be used to signal, by means of an identifier for a network model, which neural network model(s) may be used in the absence of the actual model itself.

Following the adaptation of the video to the target client end-point, an Adaptation process within the network may then choose to apply a compression algorithm to the result. In addition, the compression algorithm may optionally separate the adapted video signal into layers that correspond to the most salient to the least salient portions of the visual signal.

An example of a compression and layering process is the Progressive format of the JPEG standard (ISO/IEC 10918 Part 1) which separates the image into layers that cause the entire image to be presented first with only basic shapes and colors that are initially out of focus, i.e. from the lower-order DCT coefficients for the entire image scan, followed by additional layers of detail that cause the image to come into focus, i.e. from the higher-order DCT coefficients of the image scan.

The process of breaking media into smaller portions, organizing them into the payload portions of consecutive network protocol packets, and distributing these protocol packets is referred to as "streaming" of the media whereas the process of converting the media into a format that is suitable for presentation on one of a variety of heterogenous client end-points that is operating one of a variety of heterogenous applications is known as "adapting" the media.

Definitions

Scene graph: general data structure commonly used by vector-based graphics editing applications and modern computer games, which arranges the logical and often (but not necessarily) spatial representation of a graphical scene; a collection of nodes and vertices in a graph structure.

Node: fundamental element of the scene graph comprised of information related to the logical or spatial or temporal representation of visual, audio, haptic, olfactory, gustatory, or related processing information; each node shall have at most one output edge, zero or more input edges, and at least one edge (either input or output) connected to it.

Base Layer: a nominal representation of an asset, usually formulated to minimize the compute resources or time needed to render the asset, or the time to transmit the asset over a network.

Enhancement Layer: a set of information that when applied to the base layer representation of an asset, augments the base layer to include features or capabilities that are not supported in the base layer.

Attribute: metadata associated with a node used to describe a particular characteristic or feature of that node either in a canonical or more complex form (e.g. in terms of another node).

Container: a serialized format to store and exchange information to represent all natural, all synthetic, or a mixture of synthetic and natural scenes including a scene graph and all of the media resources that are required for rendering of the scene Serialization: the process of translating data structures or object state into a format that can be stored (for example, in a file or memory buffer) or transmitted (for example, across a network connection link) and reconstructed later (possibly in a different computer environment). When the resulting series of bits is reread according to the serialization format, it can be used to create a semantically identical clone of the original object.

Renderer: a (typically software-based) application or process, based on a selective mixture of disciplines related to: acoustic physics, light physics, visual perception, audio perception, mathematics, and software development, that, given an input scene graph and asset container, emits a typically visual and/or audio signal suitable for presentation on a targeted device or conforming to the desired properties as specified by attributes of a render target node in the scene graph. For visual-based media assets, a renderer may emit a visual signal suitable for a targeted display, or for storage as an intermediate asset (e.g. repackaged into another container i.e. used in a series of rendering processes in a graphics pipeline); for audio-based media assets, a renderer may emit an audio signal for presentation in a multi-channel loud-speaker and/or binauralized headphones, or for repackaging into another (output) container. Popular examples of renderers include: Unity, Unreal.

Evaluate: produces a result (e.g. similar to evaluation of a Document Object Model for a webpage) that causes the output to move from an abstract to a concrete result.

Scripting language: An interpreted programming language that can be executed by a renderer at runtime to process dynamic input and variable state changes made to the scene graph nodes, which affect rendering and evaluation of spatial and temporal object topology (including physical forces, constraints, IK, deformation, collisions), and energy propagation and transport (light, sound).

Shader: a type of computer program that was originally used for shading (the production of appropriate levels of light, darkness, and color within an image) but which now performs a variety of specialized functions in various fields of computer graphics special effects or does video post-processing unrelated to shading, or even functions unrelated to graphics at all.

Path Tracing: a computer graphics method of rendering three-dimensional scenes such that the illumination of the scene is faithful to reality.

Timed media: Media that is ordered by time; e.g., with a start and end time according to a particular clock.

Untimed media: Media that is organized by spatial, logical, or temporal relationships; e.g., as in an interactive experience that is realized according to the actions taken by the user(s).

Neural Network Model: a collection of parameters and tensors (e.g., matrices) that define weights (i.e., numerical values) used in well defined mathematical operations applied to the visual signal to arrive at an improved visual output which may include the interpolation of new views for the visual signal that were not explicitly provided by the original signal.

Immersive media can be regarded as one or more types of media that, when presented to a human by an immersive media-capable device, stimulates any of the five senses of sight, sound, taste, touch, and hearing, in a way that is more realistic and consistent with a human's understanding of experiences within the natural world, i.e.; stimulation beyond that which would have otherwise been achieved with legacy media presented by legacy devices. In this context, the term "legacy media" refers to two-dimensional (2D) visual media, either still or moving picture frames, and/or corresponding audio for which the user's ability to interact is limited to pause, play, fast-forward, or rewind; "legacy devices" refers to televisions, laptops, displays, and mobile devices that are constrained in their capabilities to the presentation of only legacy media. In consumer-facing application scenarios, the presentation device for the immersive media (i.e., an immersive media-capable device) is a consumer-facing hardware device that is especially equipped with the capabilities to leverage specific information that is embodied by the immersive media such that the device can create a presentation that more closely approximates the human's understanding of, and interaction with, the physical world, i.e., beyond the capabilities of a legacy device to do so. Legacy devices are constrained in their abilities to present only legacy media, whereas immersive media devices are not likewise constrained.

In the last decade, a number of immersive media-capable devices have been introduced into the consumer market, including head-mounted displays, augmented-reality glasses, hand-held controllers, haptic gloves, and game consoles. Likewise, holographic displays and other forms of volumetric displays are poised to emerge within the next decade. Despite the immediate or imminent availability of these devices, a coherent end-to-end ecosystem for the distribution of immersive media over commercial networks has failed to materialize for several reasons.

One of those reasons is the lack of a single standard representation for immersive media that can address the two major use cases relative to the current distribution of media at scale, over commercial networks: 1) real-time distribution for live action events, i.e., where the content is created and distributed to the client end-point in or near real-time, and 2) non-real-time distribution, where there is no requirement to distribute the content in real-time, i.e., as the content is being physically captured or created. Respectively, these two use cases may be comparably compared to "broadcast" and "on-demand" formats of distribution as they exist today.

For real-time distribution, the content can be captured by one or more camera(s), or created using computer generation techniques. Content that is captured by camera(s) is herein referred to as "natural" content, whereas content that is created using computer generation techniques is herein referred to as "synthetic" content. The media formats to represent synthetic content can be formats used by the 3D modelling, visual effects, and CAD/CAM industries and can include object formats and tools such as meshes, textures, point clouds, structured volumes, amorphous volumes (e.g., for fire, smoke, and fog), shaders, procedurally generated geometry, materials, lighting, virtual camera definitions, and animations. While synthetic content is computer generated, synthetic media formats can be used for both natural and synthetic content, however, the process to convert natural content into synthetic media formats (e.g., into synthetic representations) can be a time and compute intensive process, and therefore may be impractical for real-time applications and use cases.

For real-time distribution of natural content, camera-captured content can be distributed in a raster format, which is suitable for legacy display devices because many of such devices are likewise designed to display raster formats. That is, given that legacy displays are designed homogenously to display raster formats, the distribution of raster formats is therefore optimally suitable for displays that are capable of displaying only raster formats.

Immersive media-capable displays, however, are not necessarily constrained to the display of raster-based formats. Moreover, some immersive-media capable displays are unable to present media that is available only in raster-based formats. The availability of displays that are optimized to create immersive experiences based on formats other than raster-based formats is another significant reason why there is not yet a coherent end-to-end ecosystem for the distribution of immersive media.

Yet another problem with creating a coherent distribution system for multiple different immersive media devices is that the current and emerging immersive media-capable devices themselves can vary significantly. For example, some immersive media devices are explicitly designed to be used by only one user at a time, e.g., head-mounted displays. Other immersive media devices are designed so that they can be used by more than one user simultaneously, e.g., the "Looking Glass Factory 8K display" (henceforth called "lenticular light field display") can display content that can be viewed by up to 12 users simultaneously, where each user is experiencing his or her own unique perspective (i.e., view) of the content that is being displayed.

Further complicating the development of a coherent distribution system is that the number of unique perspectives, or views, that each display is capable of producing can vary greatly. In most cases, legacy displays can create only a single perspective of the content. Whereas, the lenticular light field display can support multiple users with each user experiencing unique perspectives of the same visual scene. To accomplish this creation of multiple views of the same scene, the lenticular light field display creates a specific volumetric viewing frustum in which 45 unique perspectives or views of the same scene are required as input to the display. This means that 45 slightly different unique raster representations of the same scene need to be captured and distributed to the display in a format that is specific to this one particular display, i.e., its viewing frustum. In contrast, the viewing frustum of legacy displays is limited to a single two-dimensional plane, and hence there is no way to present more than one viewing perspective of the content via the display's viewing frustum regardless of the number of simultaneous viewers that are experiencing the display.

In general, immersive media displays can vary significantly according to these following characteristics of all displays: the dimensions and volume of the viewing frustum, the number of viewers supported simultaneously, the optical technology used to fill the viewing frustum which can be point-based, ray-based, or wave-based technologies, the density of the units-of-light (either points, rays, or waves) that occupy the viewing frustum, the availability of compute power and type of compute (CPU or GPU), the source and availability of power (battery or wire), the amount of local storage or cache, and access to auxiliary resources such as cloud-based compute and storage. These characteristics contribute to the heterogeneity of immersive media displays, which in contrast to the homogeneity of legacy displays, complicates the development of a single distribution system that can support all of them, including both legacy and immersive types of displays.

The disclosed subject matter addresses the development of a network-based media distribution system that can support both legacy and immersive media displays as client end-points within the context of a single network. Specifically, a mechanism to adapt an input immersive media source into a format that is suitable to the specific characteristics of a client end-point device, including the application that is currently executing on that client end-point device, is presented herein. Such a mechanism of adapting an input immersive media source includes reconciling the characteristics of the input immersive media with the characteristics of the target end-point client device, including the application that is executing on the client device, and then adapting the input immersive media into a format suitable for the target end point and its application.

Moreover, the adaptation process may include interpolating additional views, e.g., novel views, from the input media to create additional views that are required by the client end-point. Such interpolation may be performed with the aid of a neural network process.

Note that the remainder of the disclosed subject matter assumes, without loss of generality, that the process of adapting an input immersive media source to a specific end-point client device is the same as, or similar to, the process of adapting the same input immersive media source to the specific application that is being executed on the specific client end-point device. That is, the problem of adapting an input media source to the characteristics of an end-point device are of the same complexity as the problem to adapt a specific input media source to the characteristics of a specific application.

Legacy devices, supported by legacy media, have achieved wide-scale consumer adoption because they are likewise supported by an ecosystem of legacy media content providers that produce standards-based representations of legacy media, and commercial network service providers that provide network infrastructure to connect legacy devices to sources of standard legacy content. Beyond the role of distributing legacy media over networks, commercial network service providers may also facilitate the pairing of legacy client devices with access to legacy content on content distribution networks (CDNs). Once paired with access to suitable forms of content, the legacy client device can then request, or "pull," the legacy content from the content server to the device for presentation to the end user. Nevertheless, an architecture where the network server "pushes" the appropriate media to the appropriate client is equally relevant without incurring additional complexity to the overall architecture and solution design.

Aspects are described herein with reference to flowchart illustrations and/or block diagrams of methods, apparatus (systems), and computer readable media according to the various embodiments. It will be understood that each block of the flowchart illustrations and/or block diagrams, and combinations of blocks in the flowchart illustrations and/or block diagrams, can be implemented by computer readable program instructions.

The following described exemplary embodiments relate to architectures, structures and components for systems and networks that distribute media, including video, audio, geometric (3D) objects, haptics, associated metadata, or other content for a client device. Particular embodiments are directed systems, structures, and architectures for distribution of media content to heterogenous immersive and interactive client device.

FIG. 1 is an example illustration of the end-to-end process of timed legacy media distribution. In FIG. 1, timed audio-visual content is either captured by a camera or microphone in 101A or generated by a computer in 101B, creating a sequence 102 of 2D images and associated audio that are input to a Preparation Module 103. The output of 103 is edited content (e.g. for post-production including language translations, subtitles, other editing functions), referred to as a Master Format that is ready to be converted to a standard Mezzanine Format, e.g., for on-demand media, or as a standard Contribution Format, e.g., for live events, by a Converter Module 104. The media is "ingested" by the Commercial Network Service Provider and an Adaptation Module 105 packages the media into various bitrates, temporal resolutions (frame rates) or spatial resolutions (frame sizes) that are packaged into a standard Distribution Format. The resulting adaptations are stored onto a Content Distribution Network 106 from which various clients 108 make pull-requests 107 to fetch and present the media to the end user. It is important to note that the Master Format may consist of a hybrid of media from both 101A or 101B, and that the format 101A may be obtained in real-time, e.g., such as media that is obtained from a live sporting event. Furthermore, clients 108 are responsible for choosing the specific adaptations 107 that are best suited for the client's configuration and/or for the current network conditions, but it is equally possible that the network server (not shown in FIG. 1) could determine and subsequently "push" the appropriate content to the clients 108.

Figure 2:
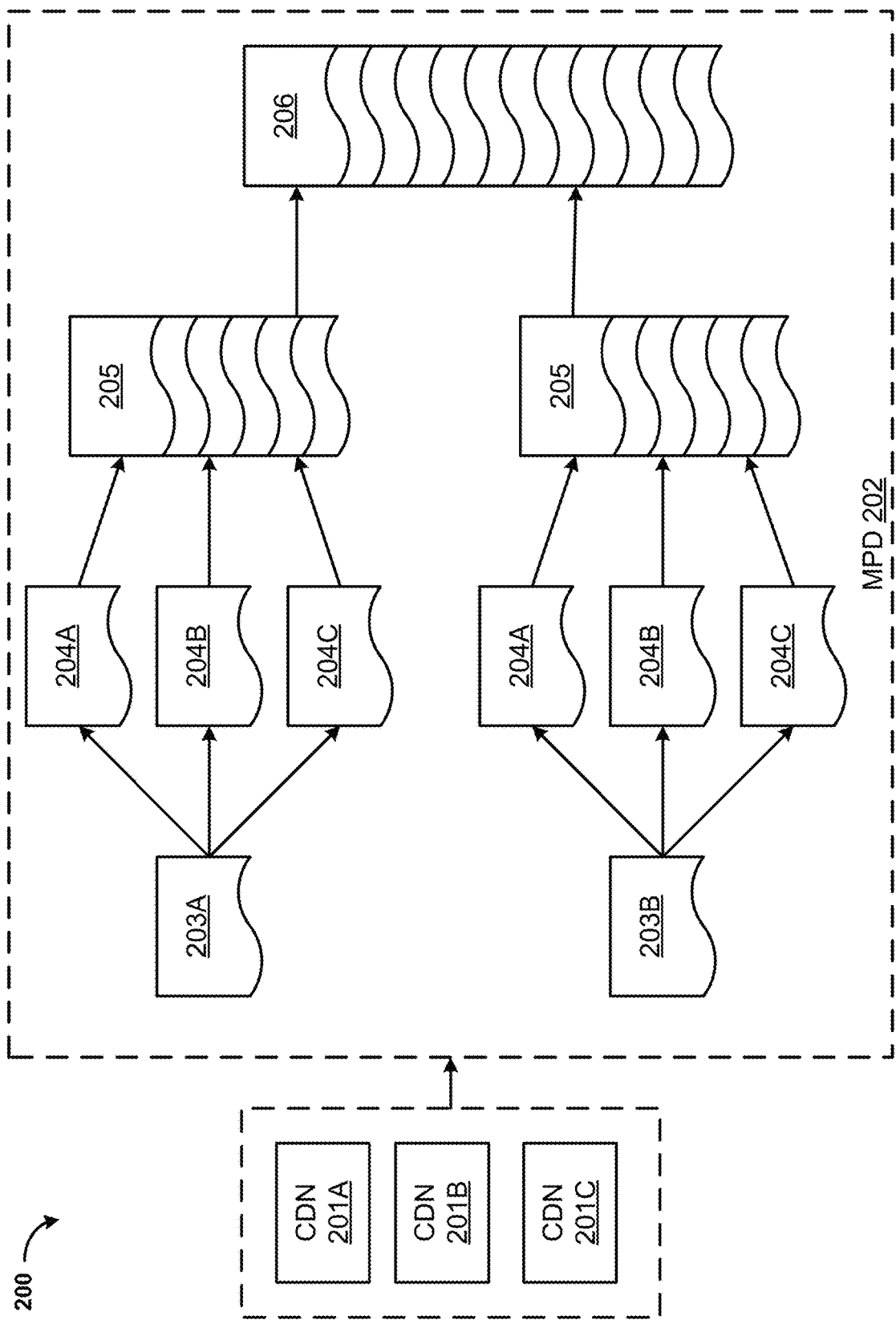
FIG. 2 is a schematic illustration of the standard media format used for streaming of timed legacy media.

FIG. 2 is an example of a standard media format used for distribution of legacy timed media, e.g., video, audio, and supporting metadata (including timed text such as used for subtitles). As noted in item 106 in FIG. 1, the media is stored in a standards-based distribution format onto CDNs 201. The standards-based format is shown as MPD 202, which consists of multiple sections encompassing timed Periods 203 with a start and end time corresponding to a clock. Each Period 203 refers to one or more Adaptation Sets 204. Each Adaptation Set 204 is generally used for a single type of media, e.g. video, audio, or timed text. For any given Period 203, multiple Adaptation Sets 204 may be provided, e.g., one for video, and multiple for audio such as used for translations into various languages. Each Adaptation Set 204 refers to one or more Representations 205 that provide information about the frame resolution (for video), frame-rate, and bitrate of the media. Multiple Representations 205 may be used to provide access to, for example, a Representation 205 each for Ultra-High-Definition, High Definition, or Standard Definition video. Each Representation 205 refers to one or more Segment Files 206 where the media is actually stored for fetching by the client (as shown as 108 in FIG. 1) or for distribution (in a "push-based" architecture) by the network media server (not shown in FIG. 1).

Figure 3:
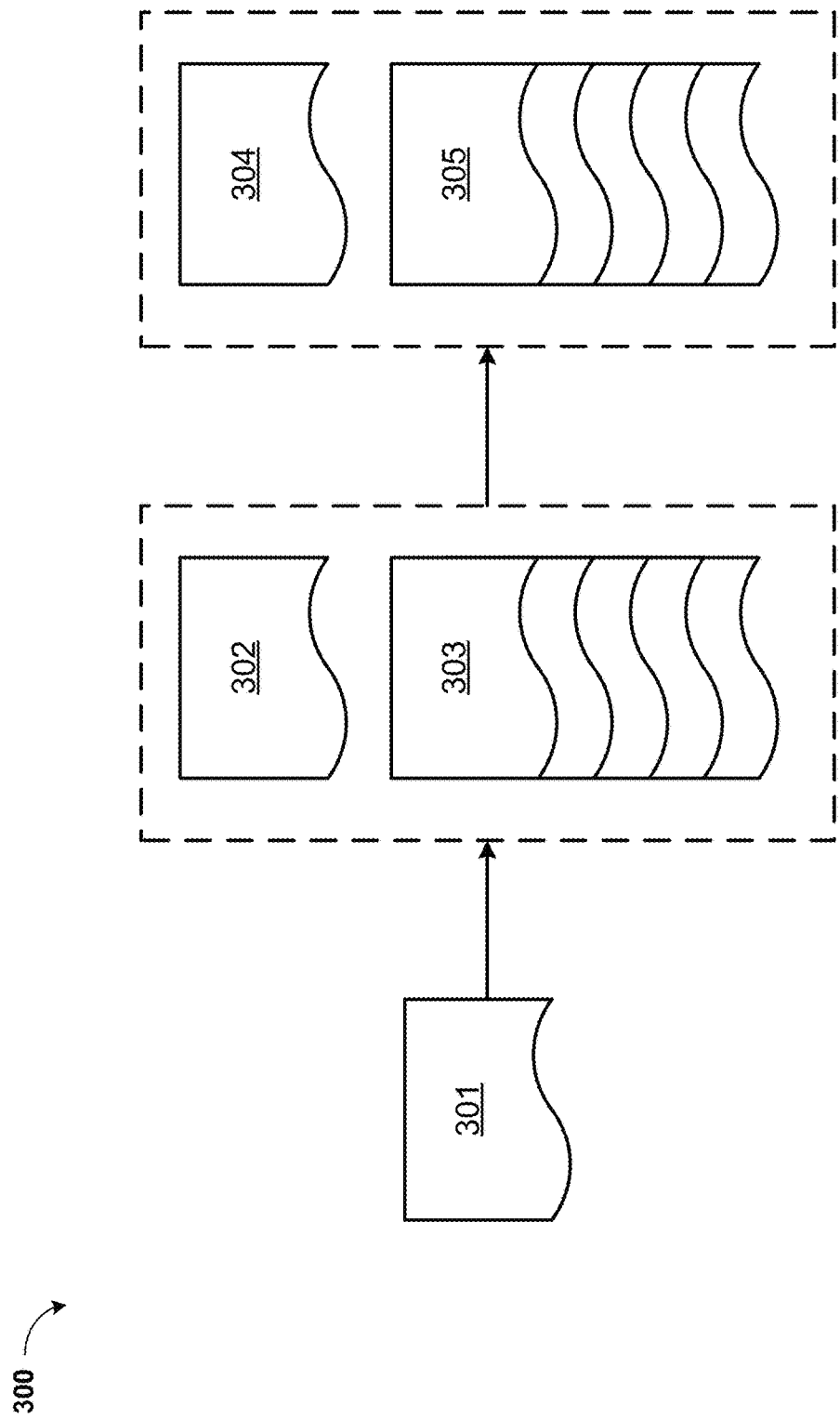
FIG. 3 is a schematic illustration of an embodiment of a data-model for the representation and streaming of timed immersive media.
Figure 4:
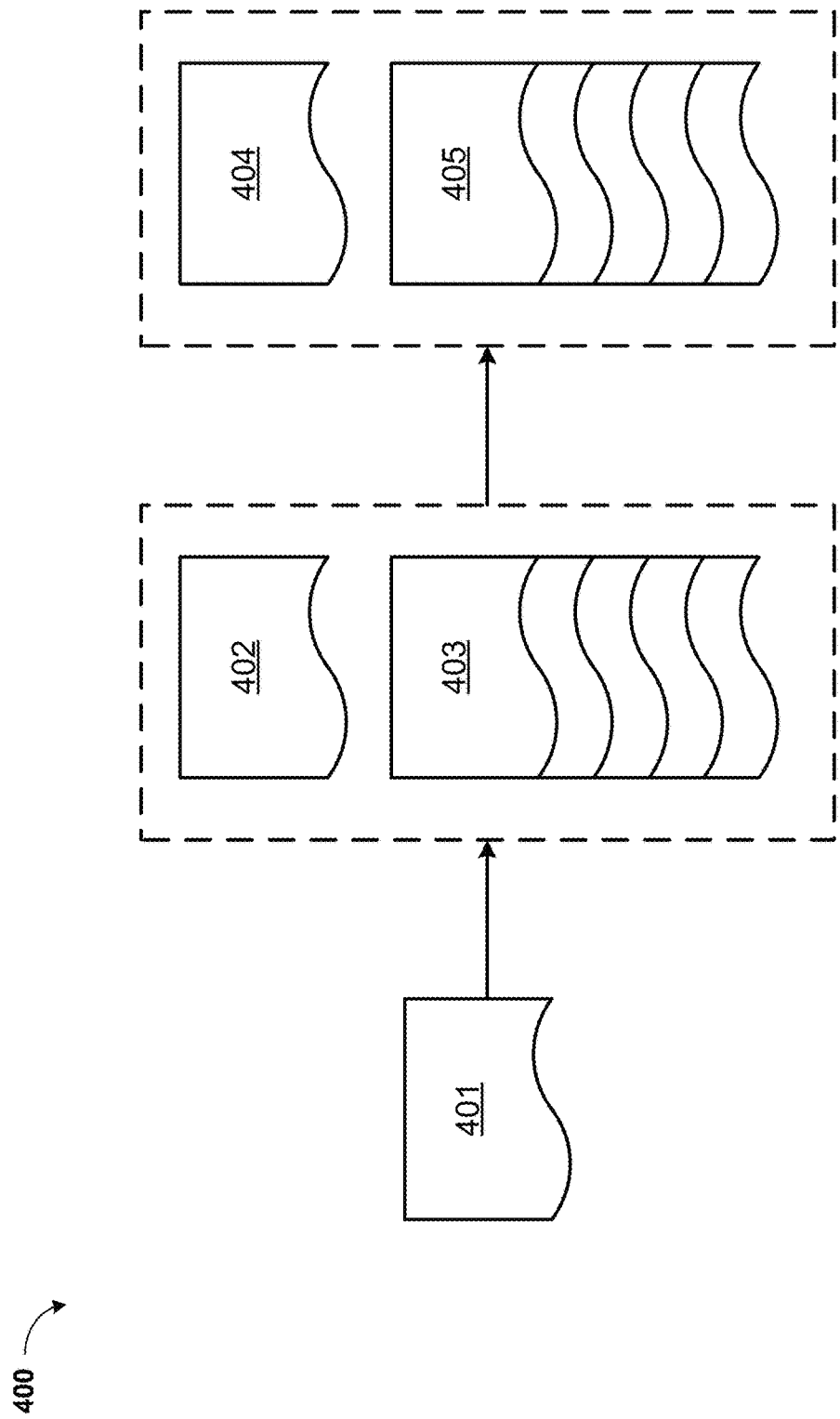
FIG. 4 is a schematic illustration of an embodiment of a data-model for the representation and streaming of untimed immersive media.

FIG. 3 is an example representation of a streamable format for heterogenous immersive media that is timed. FIG. 4 is an example representation of a streamable format for heterogeneous immersive media that is untimed. Both figures refer to a Scene; FIG. 3 refers to Scene 301 for timed media and FIG. 4 refers to Scene 401 for untimed media. For both cases, the Scene may be embodied by various scene representations, or scene descriptions.

For example, in some immersive media designs, a scene may be embodied by a Scene Graph, or as a Multi-Plane Image (MPI), or as a Multi-Spherical Image (MSI). Both the MPI and MSI techniques are examples of technologies that aid in the creation of display-agnostic scene representations for natural content, i.e., images of the real world captured simultaneously from one or more cameras. Scene Graph technologies, on the other hand, may be employed to represent both natural and computer-generated imagery in the form of synthetic representations, however, such representations are especially compute-intensive to create for the case when the content is captured as natural scenes by one or more cameras. That is, scene graph representations of naturally-captured content are both time and compute-intensive to create, requiring complex analysis of natural images with techniques of photogrammetry or deep learning or both, in order to create synthetic representations that can subsequently be used to interpolate sufficient and adequate numbers of views to fill a target immersive client display's viewing frustum. As a result, such synthetic representations are presently impractical to consider as candidates for representing natural content, because they cannot practically be created in real-time for consideration of use cases that require real-time distribution. Nevertheless, at present, the best candidate representations for computer generated imagery is to employ the use of a scene graph with synthetic models, as computer generated imagery is created using 3D modeling processes and tools.

Such a dichotomy in optimal representations of both natural and computer generated content suggests that the optimal ingest format for naturally-captured content is different from the optimal ingest format for computer generated content or for natural content that is not essential for real-time distribution applications. Therefore, the disclosed subject matter targets to be robust enough to support multiple ingest formats for visually immersive media, whether they are created naturally or by computer.

The following are example technologies that embody scene graphs as a format suitable for representing visual immersive media that is created using computer generated techniques, or naturally captured content for which deep learning or photogrammetry techniques are employed to create the corresponding synthetic representations of a natural scene, i.e., not essential for real-time distribution applications.

1. ORBX® by OTOY

ORBX by OTOY is one of several scene graph technologies that is able to support any type of visual media, timed or untimed, including ray-traceable, legacy (frame-based), volumetric, and other types of synthetic or vector-based visual formats. ORBX is unique from other scene graphs because ORBX provides native support for freely available and/or open source formats for meshes, point clouds, and textures. ORBX is a scene graph that has been intentionally designed with the goal of facilitating interchange across multiple vendor technologies that operate on scene graphs. Moreover, ORBX provides a rich materials system, support for Open Shader Language, a robust camera system, and support for Lua Scripts. ORBX is also the basis of the Immersive Technologies Media Format published for license under royalty-free terms by the Immersive Digital Experiences Alliance (IDEA). In the context of real time distribution of media, the ability to create and distribute an ORBX representation of a natural scene is a function of the availability of compute resources to perform a complex analysis of the camera-captured data and synthesis of the same data into synthetic representations. To date, the availability of sufficient compute for real-time distribution is not practical, but nevertheless, not impossible.

2. Universal Scene Description by Pixar

Universal Scene Description (USD) by Pixar is another well-known, and mature scene graph that is popular in the VFX and professional content production communities. USD is integrated into Nvidia's Omniverse platform which is a set of tools for developers for 3D model creation and rendering with Nvidia's GPUs. A subset of USD was published by Apple and Pixar as USDZ. USDZ is supported by Apple's ARKit.

3. glTF2.0 by Khronos glTF2.0 is the most recent version of the "Graphics Language Transmission Format" specification written by the Khronos 3D Group. This format supports a simple scene graph format that is generally capable of supporting static (untimed) objects in scenes, including "png" and "jpeg" image formats. glTF2.0 supports simple animations, including support for translate, rotate, and scale, of basic shapes described using the glTF primitives, i.e. for geometric objects. glTF2.0 does not support timed media, and hence does not support video nor audio.

These known designs for scene representations of immersive visual media are provided for example only, and do not limit the disclosed subject matter in its ability to specify a process to adapt an input immersive media source into a format that is suitable to the specific characteristics of a client end-point device.

Moreover, any or all of the above example media representations either currently employ or may employ deep learning techniques to train and create a neural network model that enables or facilitates the selection of specific views to fill a particular display's viewing frustum based on the specific dimensions of the frustum. The views that are chosen for the particular display's viewing frustum may be interpolated from existing views that are explicitly provided in the scene representation, e.g., from the MSI or MPI techniques, or they may be directly rendered from render engines based on specific virtual camera locations, filters, or descriptions of virtual cameras for these render engines.

The disclosed subject matter is therefore robust enough to consider that there is a relatively small but well known set of immersive media ingest formats that is sufficiently capable to satisfy requirements both for real-time or "on-demand" (e.g., non-real-time) distribution of media that is either captured naturally (e.g., with one or more cameras) or created using computer generated techniques.

Interpolation of views from an immersive media ingest format by use of either neural network models or network-based render engines is further facilitated as advanced network technologies such as 5G for mobile networks, and fibre optical cable for fixed networks are deployed. That is, these advanced network technologies increase the capacity and capabilities of commercial networks because such advanced network infrastructures can support transport and delivery of increasingly larger amounts of visual information. Network infrastructure management technologies such as Multi-access Edge Computing (MEC), Software Defined Networks (SDN), and Network Functions Virtualization (NFV), enable commercial network service providers to flexibly configure their network infrastructure to adapt to changes in demand for certain network resources, e.g., to respond to dynamic increases or decreases in demand for network throughputs, network speeds, roundtrip latency, and compute resources. Moreover, this inherent ability to adapt to dynamic network requirements likewise facilitates the ability of networks to adapt immersive media ingest formats to suitable distribution formats in order to support a variety of immersive media applications with potentially heterogenous visual media formats for heterogenous client end-points.

Immersive Media applications themselves may also have varying requirements for network resources including gaming applications which require significantly lower network latencies to respond to real-time updates in the state of the game, telepresence applications which have symmetric throughput requirements for both the uplink and downlink portions of the network, and passive viewing applications that may have increased demand for downlink resources depending on the type of client end-point display that is consuming the data. In general, any consumer-facing application may be supported by a variety of client end-points with various onboard-client capabilities for storage, compute, and power, and likewise various requirements for particular media representations.

The disclosed subject matter therefore enables a sufficiently equipped network, i.e., a network that employs some or all of the characteristics of a modern network, to simultaneously support a plurality of legacy and immersive media-capable devices according to features that are specified within that:

1. Provide flexibility to leverage media ingest formats that are practical for both real-time and "on demand" use cases for the distribution of media.
2. Provide flexibility to support both natural and computer generated content for both legacy and immersive-media capable client end-points.
3. Support both timed and untimed media.
4. Provide a process for dynamically adapting a source media ingest format to a suitable distribution format based on the features and capabilities of the client end-point, as well as based on the requirements of the application.
5. Ensure that the distribution format is streamable over IP-based networks.
6. Enable the network to simultaneously serve a plurality of heterogenous client end-points that may include both legacy and immersive media-capable devices.
7. Provide an exemplary media representation framework that facilitates the organization of the distribution media along scene boundaries.

An example of an end-to-end embodiment of the improvements enabled by the disclosed subject matter is achieved according to the processing and components described the detailed description of FIGS. 3 through 14 as follows.

FIG. 3 and FIG. 4 both employ a single exemplary encompassing distribution format that has been adapted from an ingest source format to match the capabilities of a specific client end-point. As described above, the media that is shown in FIG. 3 is timed and the media that is shown in FIG. 4 is untimed. The specific encompassing format is robust enough in its structure to accommodate a large variety of media attributes that each may be layered based on the amount of salient information that each layer contributes to the presentation of the media. Note that such a layering process is already a well-known technique in the current state-of-the-art as demonstrated with Progressive JPEG and scalable video architectures such as those specified in ISO/IEC 14496-10 (Scalable Advanced Video Coding).

1. The media that is streamed according to the encompassing media format is not limited to legacy visual and audio media, but may include any type of media information that is capable of producing a signal that interacts with machines to stimulate the human senses for sight, sound, taste, touch, and smell.

2. The media that is streamed according to the encompassing media format can be both timed or untimed media, or a mixture of both.

3. The encompassing media format is furthermore streamable by enabling a layered representation for media objects by use of a base layer and enhancement layer architecture. In one example, the separate base layer and enhancement layers are computed by application of multi-resolution or multi-tesselation analysis techniques for media objects in each scene. This is analogous to the progressively rendered image formats specified in ISO/IEC 10918-1 (JPEG), and ISO/IEC 15444-1 (JPEG2000), but not limited to raster-based visual formats. In an example embodiment, a progressive representation for a geometric object could be a multi-resolution representation of the object computed using wavelet analysis.

In another example of the layered representation of the media format, the enhancement layers apply different attributes to the base layer, such as refining the material properties of the surface of a visual object that is represented by the base layer. In yet another example, the attributes may refine the texture of the surface of the base layer object, such as changing the surface from a smooth to a porous texture, or from a matted surface to a glossy surface.

In yet another example of the layered representation, the surfaces of one or more visual objects in the scene may be altered from being Lambertian to being ray-traceable.

In yet another example of the layered representation, the network will distribute the base-layer representation to the client so that the client may create a nominal presentation of the scene while the client awaits the transmission of additional enhancement layers to refine the resolution or other characteristics of the base representation.

4. The resolution of the attributes or refining information in the enhancement layers is not explicitly coupled with the resolution of the object in the base layer as it is today in existing MPEG video and JPEG image standards.

5. The encompassing media format supports any type of information media that can be presented or actuated by a presentation device or machine, thereby enabling the support of heterogenous media formats to heterogenous client end-points. In one embodiment of a network that distributes the media format, the network will first query the client end-point to determine the client's capabilities, and if the client is not capable of meaningfully ingesting the media representation then the network will either remove the layers of attributes that are not supported by the client, or transcode the media from its current format into a format that is suitable for the client end-point. In one example of such transcoding, the network would convert a volumetric visual media asset into a 2D representation of the same visual asset, by use of a Network-Based Media Processing protocol.

6. The manifest for a complete or partially-complete immersive experience (live streaming event, game, or playback of on-demand asset) is organized by scenes which is the minimal amount of information that rendering and game engines can currently ingest in order to create a presentation. The manifest includes a list of the individual scenes that are to be rendered for the entirety of the immersive experience requested by the client. Associated with each scene are one or more representations of the geometric objects within the scene corresponding to streamable versions of the scene geometry. One embodiment of a scene representation refers to a low resolution version of the geometric objects for the scene. Another embodiment of the same scene refers to an enhancement layer for the low resolution representation of the scene to add additional detail, or increase tessellation, to the geometric objects of the same scene. As described above, each scene may have more than one enhancement layer to increase the detail of the geometric objects of the scene in a progressive manner.

7. Each layer of the media objects that are referenced within a scene is associated with a token (e.g., URI) that points to the address of where the resource can be accessed within the network. Such resources are analogous to CDN's where the content may be fetched by the client.

8. The token for a representation of a geometric object may point to a location within the network or to a location within the client. That is, the client may signal to the network that its resources are available to the network for network-based media processing.

FIG. 3 describes an embodiment of the encompassing media format for timed media as follows. The Timed Scene Manifest includes a list of Scene information 301. The Scene 301 refers to a list of Components 302 that separately describe processing information and types of media assets that comprise Scene 301. Components 302 refer to Assets 303 that further refer to Base Layers 304 and Attribute Enhancement Layers 305.

FIG. 4 describes an embodiment of the encompassing media format for untimed media as follows. The Scene Information 401 is not associated with a start and end duration according to a clock. Scene Information 401 refers to a list of Components 402 that separately describe processing information and types of media assets that comprise Scene 401. Components 402 refer to Assets 403 (e.g., visual, audio, and haptic assets) that further refer to Base Layers 404 and Attribute Enhancement Layers 405. Furthermore, Scene 401 refers to other Scenes 401 that are for untimed media. Scene 401 also refers to a timed media scene.

Figure 5:
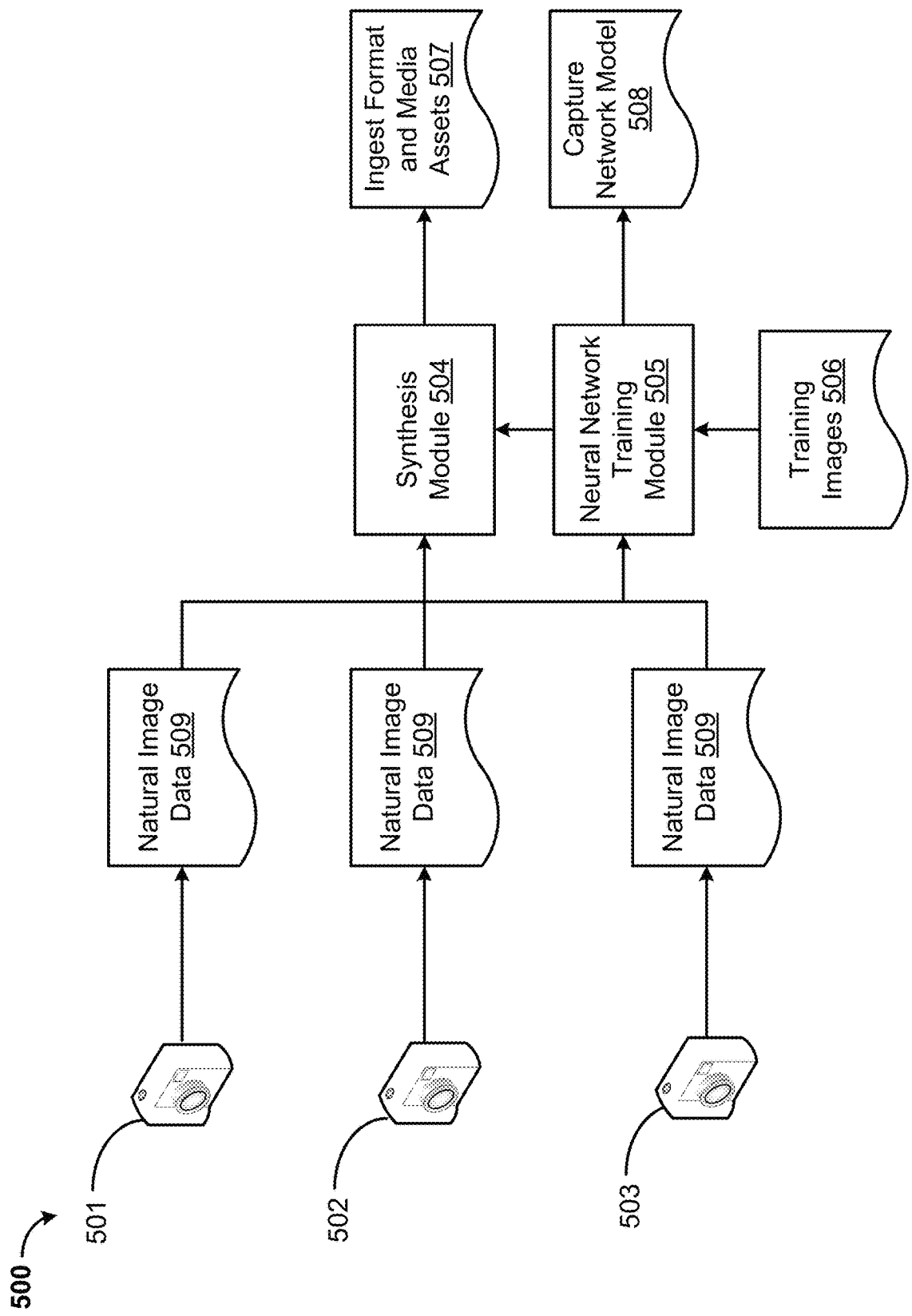
FIG. 5 is a schematic illustration of a process of capturing a natural scene and converting it to a representation that can be used as an ingest format for a network that serves heterogenous client end-points.

FIG. 5 illustrates an embodiment of Process 500 to synthesize an ingest format from natural content. Camera unit 501 uses a single camera lens to capture a scene of a person. Camera unit 502 captures a scene with five diverging fields of view by mounting five camera lenses around a ring-shaped object. The arrangement in 502 is an exemplary arrangement commonly used to capture omnidirectional content for VR applications. Camera unit 503 captures a scene with seven converging fields of view by mounting seven camera lenses on the inner diameter portion of a sphere. The arrangement 503 is an exemplary arrangement commonly used to capture light fields for light field or holographic immersive displays. Natural image content 509 is provided as input to Synthesis Module 504 that may optionally employ a Neural Network Training Module 505 using a collection of Training Images 506 to produce an optional Capture Neural Network Model 508. Another process commonly used in lieu of training process 505 is Photogrammetry. If model 508 is created during process 500 depicted in FIG. 5, then model 508 becomes one of the assets in the Ingest Format 507 for the natural content. Exemplary embodiments of the Ingest Format 507 include MPI and MSI.

Figure 6:
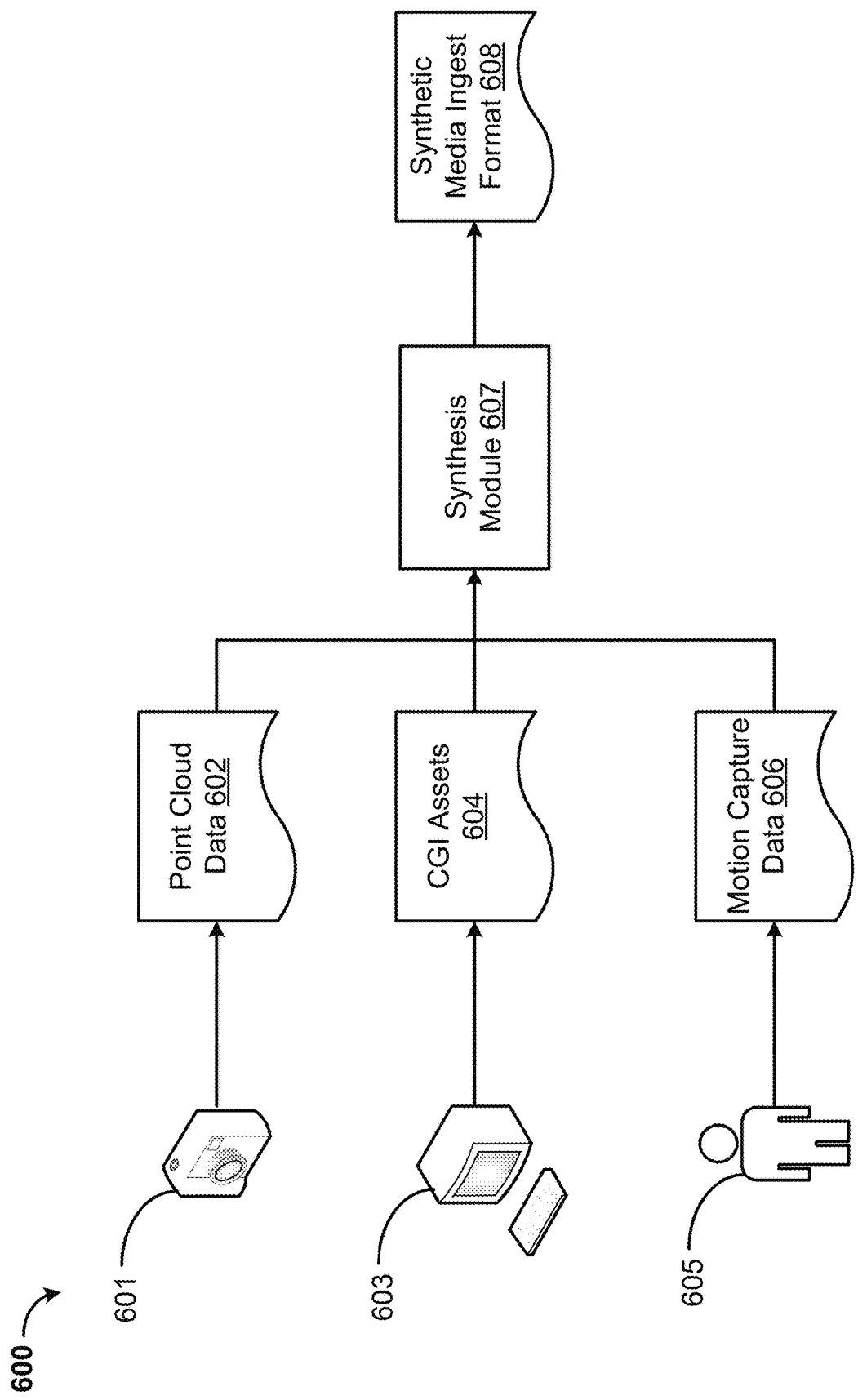
FIG. 6 is a schematic illustration of a process of using 3D modeling tools and formats to create a representation of a synthetic scene that can be used as an ingest format for a network that serves heterogenous client end-points.

FIG. 6 illustrates an embodiment of a Process 600 to create an ingest format for synthetic media, e.g., computer-generated imagery. LIDAR Camera 601 captures Point Clouds 602 of scene. CGI tools, 3D modelling tools, or another animation processes to create synthetic content are employed on Computer 603 to create 604 CGI Assets over a network. Motion Capture Suit with Sensors 605A is worn on Actor 605 to capture a digital recording of the motion for actor 605 to produce animated MoCap Data 606. Data 602, 604, and 606 are provided as input to Synthesis Module 607 which likewise may optionally use a neural network and training data to create a neural network model (not shown in FIG. 6).

The techniques for representing and streaming heterogeneous immersive media described above, can be implemented as computer software using computer-readable instructions and physically stored in one or more computer-readable media. For example, FIG. 7 shows a computer system 700 suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 7:
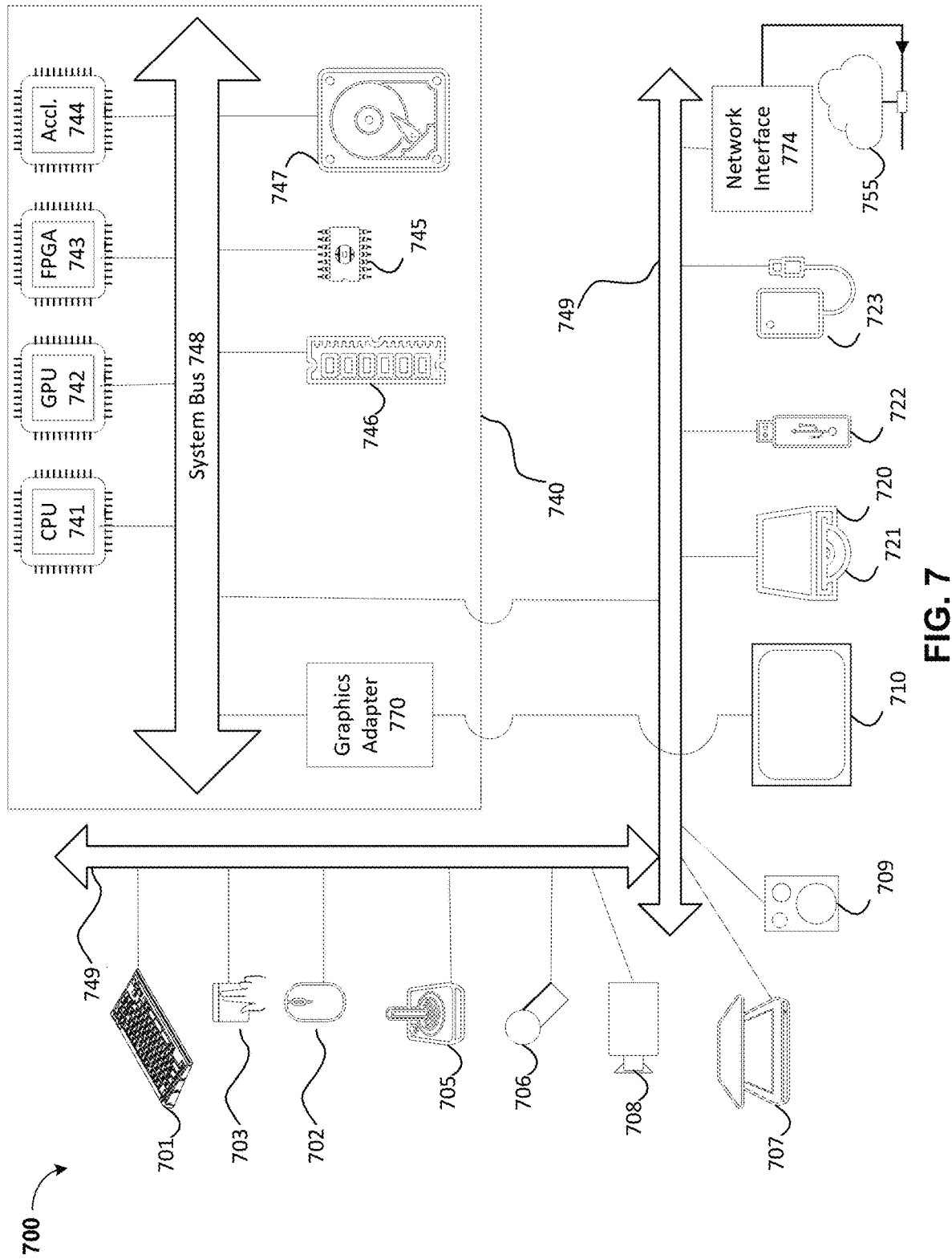
FIG. 7 is a system diagram of computer system.

The components shown in FIG. 7 for computer system 700 are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system 700.

Computer system 700 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard 701, mouse 702, trackpad 703, touch screen 710, data-glove (not depicted), joystick 705, microphone 706, scanner 707, camera 708.

Computer system 700 may also include certain human interface output devices. Such human interface output devices may be stimulating the senses of one or more human users through, for example, tactile output, sound, light, and smell/taste. Such human interface output devices may include tactile output devices (for example tactile feedback by the touch-screen 710, data-glove (not depicted), or joystick 705, but there can also be tactile feedback devices that do not serve as input devices), audio output devices (such as: speakers 709, headphones (not depicted)), visual output devices (such as screens 710 to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system 700 can also include human accessible storage devices and their associated media such as optical media including CD/DVD ROM/RW 720 with CD/DVD or the like media 721, thumb-drive 722, removable hard drive or solid state drive 723, legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system 700 can also include interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (749) (such as, for example USB ports of the computer system 700; others are commonly integrated into the core of the computer system 700 by attachment to a system bus as described below (for example Ethernet interface into a PC computer system or cellular network interface into a smartphone computer system). Using any of these networks, computer system 700 can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core 740 of the computer system 700.

The core 740 can include one or more Central Processing Units (CPU) 741, Graphics Processing Units (GPU) 742, specialized programmable processing units in the form of Field Programmable Gate Areas (FPGA) 743, hardware accelerators for certain tasks 744, and so forth. These devices, along with Read-only memory (ROM) 745, Random-access memory 746, internal mass storage such as internal non-user accessible hard drives, SSDs, and the like 747, may be connected through a system bus 748. In some computer systems, the system bus 748 can be accessible in the form of one or more physical plugs to enable extensions by additional CPUs, GPU, and the like. The peripheral devices can be attached either directly to the core's system bus 748, or through a peripheral bus 749. Architectures for a peripheral bus include PCI, USB, and the like.

CPUs 741, GPUs 742, FPGAs 743, and accelerators 744 can execute certain instructions that, in combination, can make up the aforementioned computer code. That computer code can be stored in ROM 745 or RAM 746. Transitional data can be also stored in RAM 746, whereas permanent data can be stored for example, in the internal mass storage 747. Fast storage and retrieve to any of the memory devices can be enabled through the use of cache memory, that can be closely associated with one or more CPU 741, GPU 742, mass storage 747, ROM 745, RAM 746, and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture 700, and specifically the core 740 can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core 740 that are of non-transitory nature, such as core-internal mass storage 747 or ROM 745. The software implementing various embodiments of the present disclosure can be stored in such devices and executed by core 740. A computer-readable medium can include one or more memory devices or chips, according to particular needs. The software can cause the core 740 and specifically the processors therein (including CPU, GPU, FPGA, and the like) to execute particular processes or particular parts of particular processes described herein, including defining data structures stored in RAM 746 and modifying such data structures according to the processes defined by the software. In addition or as an alternative, the computer system can provide functionality as a result of logic hardwired or otherwise embodied in a circuit (for example: accelerator 744), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

Figure 8:
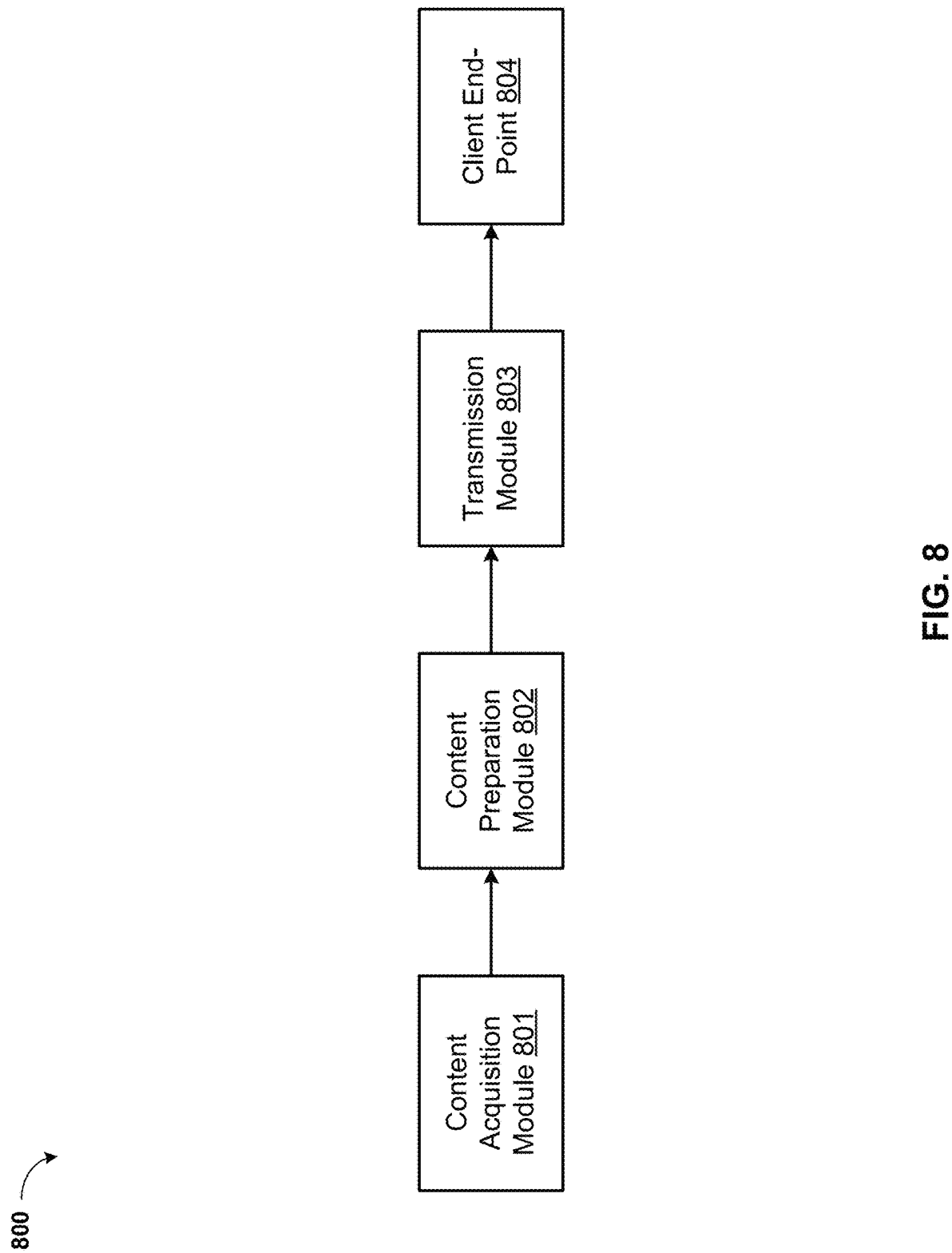
FIG. 8 is a schematic illustration of a network that serves a plurality of heterogenous client end-points.

FIG. 8 illustrates an exemplary Network Media Distribution System 800 that supports a variety of legacy and heterogenous immersive-media capable displays as client end-points. Content Acquisition Module 801 captures or creates the media using example embodiments in FIG. 6 or FIG. 5. Ingest formats are created in Content Preparation Module 802 and then are transmitted to one or more client end-points 804 in a network media distribution system using Transmission Module 803. Gateways may serve customer premise equipment to provide network access to various client end-points for the network. Set Top Boxes may also serve as customer premise equipment to provide access to aggregated content by the network service provider. Radio Demodulators may serve as mobile network access points for mobile devices (e.g., as with Mobile Handset and Displays). In one or more embodiments, Legacy 2D Televisions may be directly connected to gateways, set-top boxes, or WiFi routers. A computer laptop with a legacy 2D display may be a client end-point connected to a WiFi Router. A Head Mounted 2D (raster-based) Display may also connected to a router. A Lenticular Light Field Display may be to a gateway. A display may be comprised of local Compute GPUs, storage devices, and a Visual Presentation Unit that creates multiple views using a ray-based lenticular optical technology. A Holographic Display may be connected to a set top box and may include local compute CPUs, GPUs, storage devices, and a Fresnal pattern, wave-based holographic Visualization Unit. An Augmented Reality Headset may be connected to a radio demodulator and may include a GPU, a storage device, a battery, and a volumetric Visual Presentation Component. A Dense Light Field Display may be connected to a WiFi router and may include multiple GPUs, CPUs, and storage devices; an eye Tracking Device; a camera; and a dense ray-based light field panel.

Figure 9:
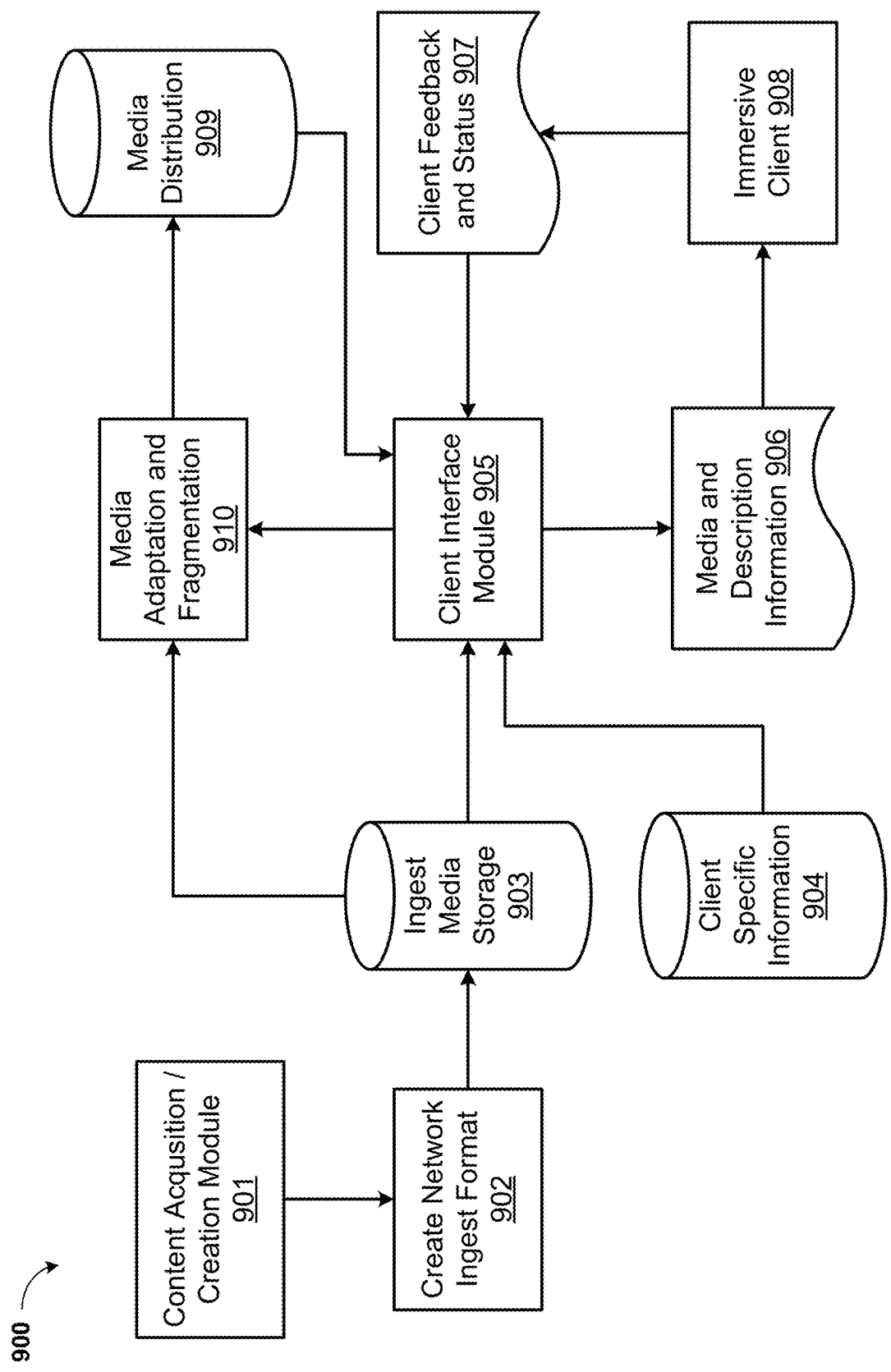
FIG. 9 is a schematic illustration of a network providing adaptation information about the specific media represented in the media ingest format, e.g., prior to the network's process of adapting the media for consumption by a specific immersive media client end-point.

FIG. 9 illustrates an embodiment of an Immersive Media Distribution Module 900 that is capable of serving legacy and heterogenous immersive media-capable displays as previously depicted in FIG. 8. Content is either created or acquired in Module 901, which is further embodied in FIG. 5 and FIG. 6 for natural and CGI content respectively. Content 901 is then converted into an ingest format using the Create Network Ingest Format Module 902. Module 902 is likewise further embodied in FIG. 5. and FIG. 6 for natural and CGI content respectively. The ingest media format is transmitted to the network and stored on Storage Device 903. Optionally, the Storage Device may reside in the immersive media content producer's network, and accessed remotely by the Immersive Media Network Distribution Module (not numbered) as depicted by the dashed line that bisects 903. Client and application specific information is optionally available on a remote Storage Device 904, which may optionally exist remotely in an alternate "cloud" network.

As depicted in FIG. 9, a Client Interface Module 905 serves as the primary source and sink of information to execute the major tasks of the distribution network. In this particular embodiment, Module 905 may be implemented in unified format with other components of the network. Nevertheless the tasks depicted by Module 905 in FIG. 9 form essential elements of the disclosed subject matter.

Module 905 receives information about the features and attributes of Client 908, and furthermore collects requirements regarding the application currently running on 908. This information may be obtained from Device 904, or in an alternate embodiment, may be obtained by directly querying the client 908. In the case of a direct query to client 908, a bi-directional protocol (not shown in FIG. 9) is assumed to be present and operational so that the client may communicate directly to the interface module 905.

Figure 10:
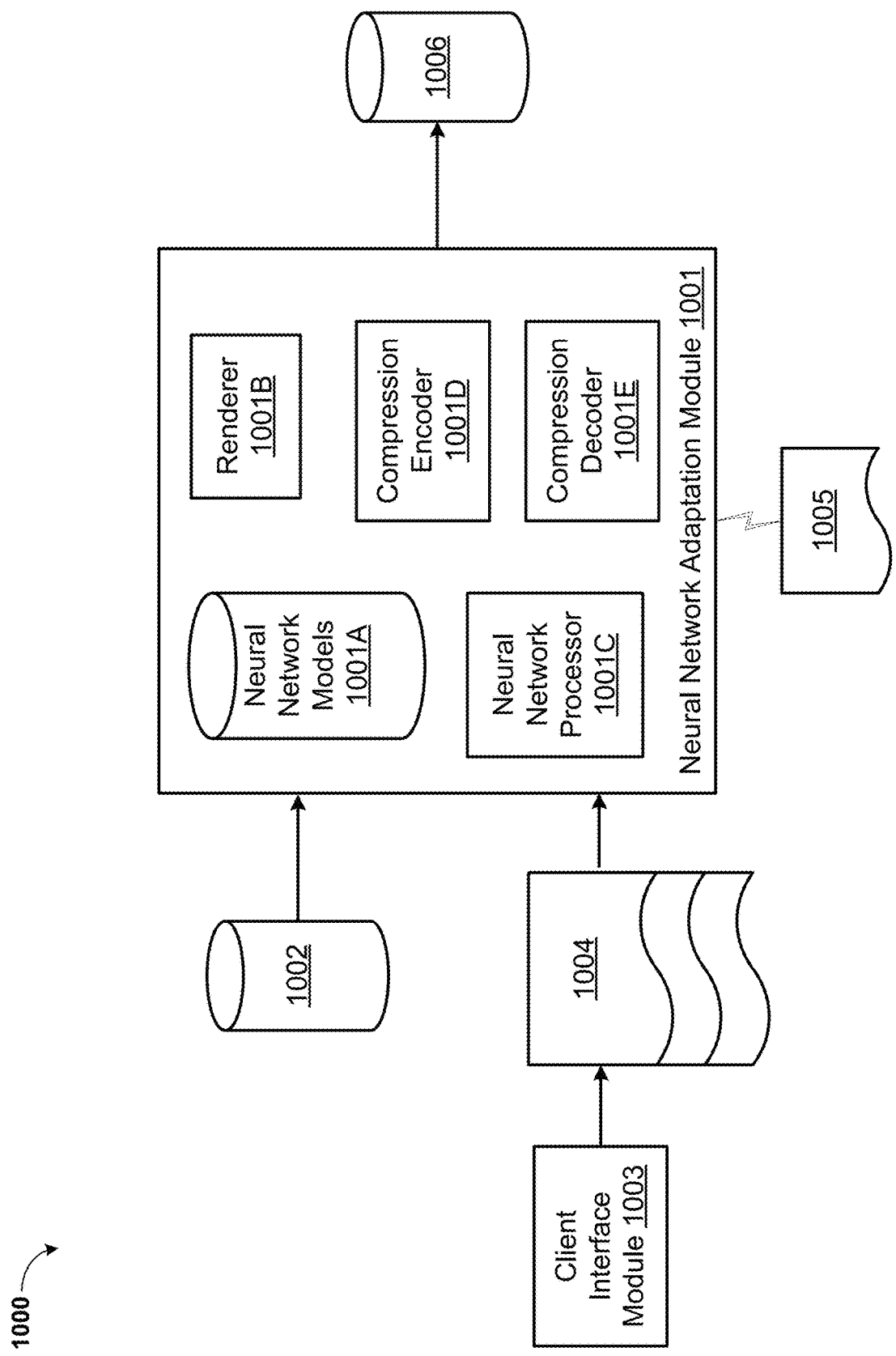
FIG. 10 is a system diagram of a media adaptation process consisting of a media render-converter that converts a source media from its ingest format to a specific format suitable for a specific client end-point.

Interface module 905 also initiates and communicates with Media Adaptation and Fragmentation Module 910 which is described in FIG. 10. As ingest media is adapted and fragmented by Module 910, the media is optionally transferred to an *intermedia* storage device depicted as the Media Prepared for Distribution Storage Device 909. As the distribution media is prepared and stored in device 909, interface module 905 ensures that Immersive Client 908, via its Network Interface 908B, either receives the distribution media and corresponding descriptive information 906 either through a "push" request, or Client 908 itself may initiate a "pull" request of the media 906 from Storage Device 909. Immersive Client 908 may optionally employ GPUs (or CPUs not shown) 908C. The Distribution Format of the media is stored in Client 908's Storage Device or Storage Cache 908D. Finally, Client 908 visually presents the media via its Visualization Component 908A.

Throughout the process of streaming the immersive media to Client 908, the Interface Module 905 will monitor the status of the Client's progress via Client Progress and Status Feedback Channel 907.

FIG. 10 depicts a particular embodiment of a Media Adaptation Process so that the ingested source media may be appropriately adapted to match the requirements of the Client 908. Media Adaptation Module 1001 is comprised of multiple components that facilitate the adaptation of the ingest media into an appropriate distribution format for Client 908. These components should be regarded as exemplary. In FIG. 10, Adaptation Module 1001 receives input Network Status 1005 to track the current traffic load on the network; Client 908 information including Attributes and Features Description, Application Features and Description as well as Application Current Status, and a Client Neural Network Model (if available) to aid in mapping the geometry of the client's frustum to the interpolation capabilities of the ingest immersive media. Adaptation Module 1001 ensures that the adapted output, as it is created, is stored into an Client-Adapted Media Storage Device 1006.

Adaptation Module 1001 employs a Renderer 1001B or a Neural Network Processor 1001C to adapt the specific ingest source media to a format that is suitable for the client. Neural Network Processor 1001C uses Neural Network Models in 1001A. Examples of such a Neural Network Processor 1001C include the Deepview neural network model generator as described in MPI and MSI. If the media is in a 2D format, but the client must have a 3D format, then the Neural Network Processor 1001C can invoke a process to use highly correlated images from a 2D video signal to derive a volumetric representation of the scene depicted in the video. An example of such a process could be the Neural Radiance Fields from One or Few Images process developed at the University of California, Berkley. An example of a suitable Renderer 1001B could be a modified version of the OTOY Octane renderer (not shown) which would be modified to interact directly with the Adaptation Module 1001. Adaptation Module 1001 may optionally employ Media Compressors 1001D and Media Decompressors 1001E depending on the need for these tools with respect to the format of the ingest media and the format required by Client 908.

Figure 11:
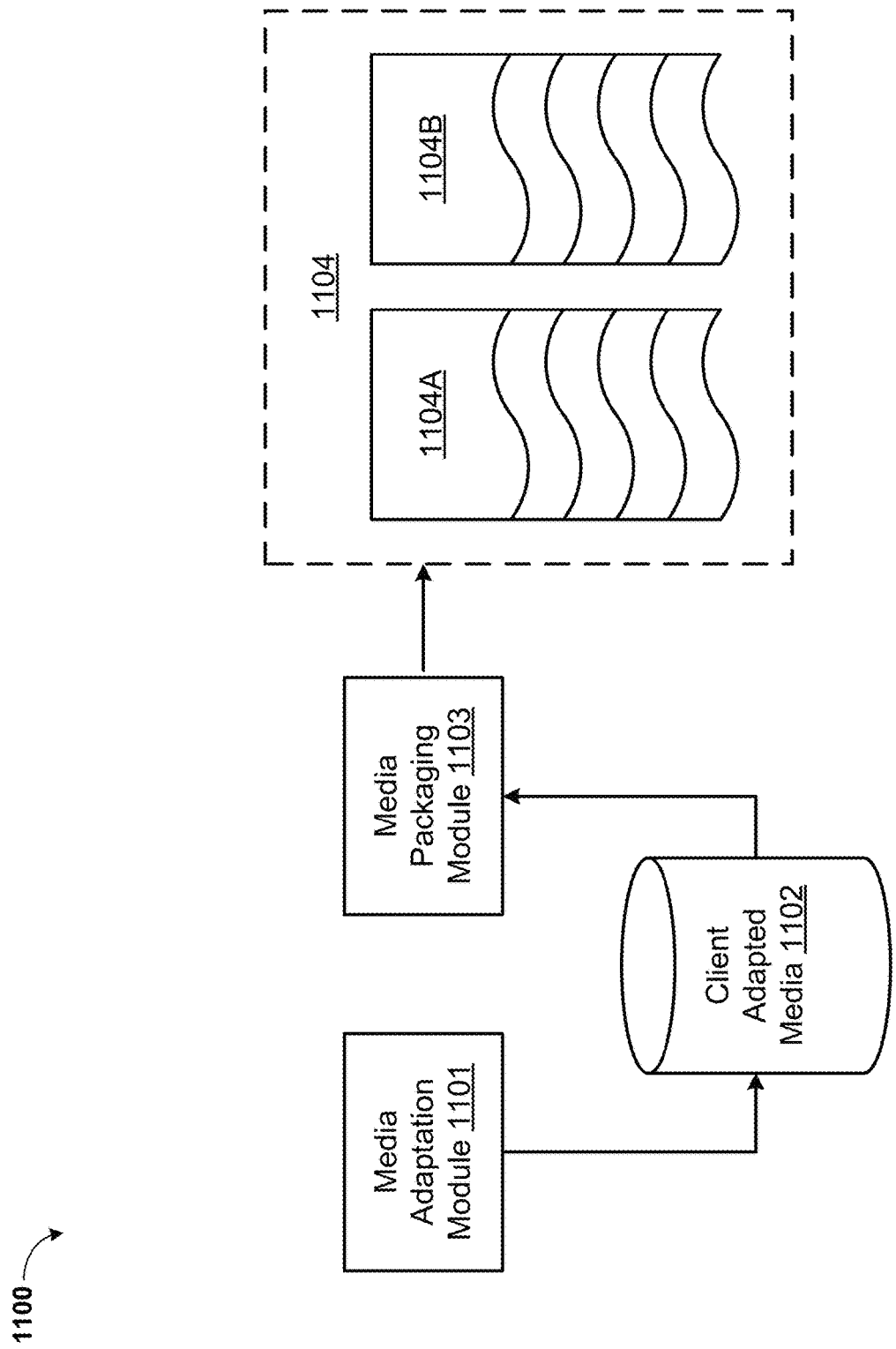
FIG. 11 is a schematic illustration of a network formatting the adapted source media into a data model suitable for representation and streaming.

FIG. 11 depicts the Adapted Media Packaging Module 1103 that ultimately converts the Adapted Media from Media Adaptation Module 1101 from FIG. 10 now residing on Client Adapted Media Storage Device 1102. The Packaging Module 1103 formats the Adapted Media from Module 1101 into a robust distribution format, for example, the exemplary formats shown in FIG. 3 or FIG. 4. Manifest Information 1104A provides Client 908 with a list of the scene data that it can expect to receive and also provides a list of Visual Assets and Corresponding Metadata, and Audio Assets and Corresponding Metadata.

Figure 12:
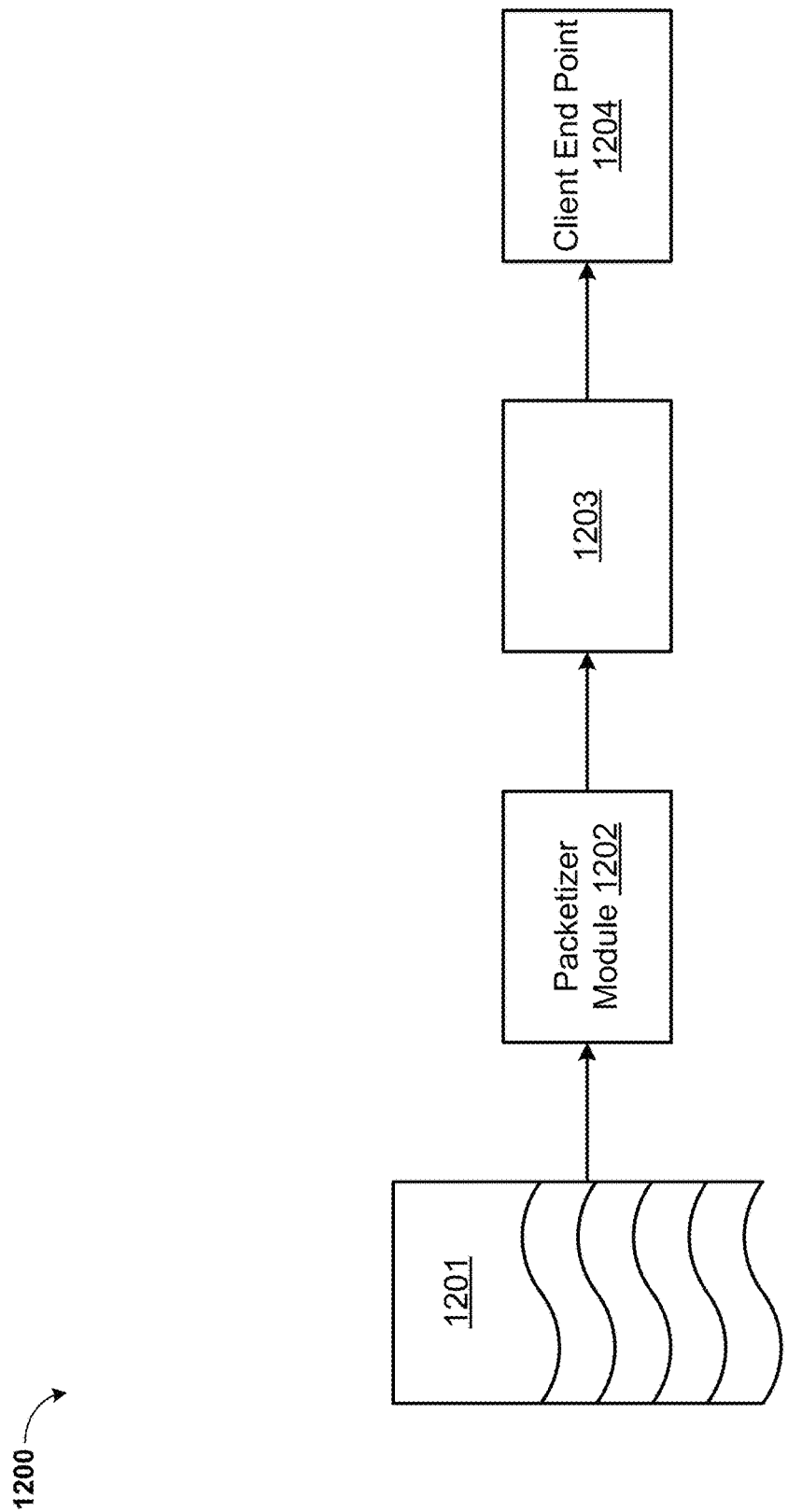
FIG. 12 is a system diagram of a media streaming process that fragments the data model of FIG. 12 into the payloads of network protocol packets.

FIG. 12 depicts a Packetizer Module 1202 that "fragments" the adapted media 1201 into individual Packets 1203 suitable for streaming to Client 908.

Figure 13:
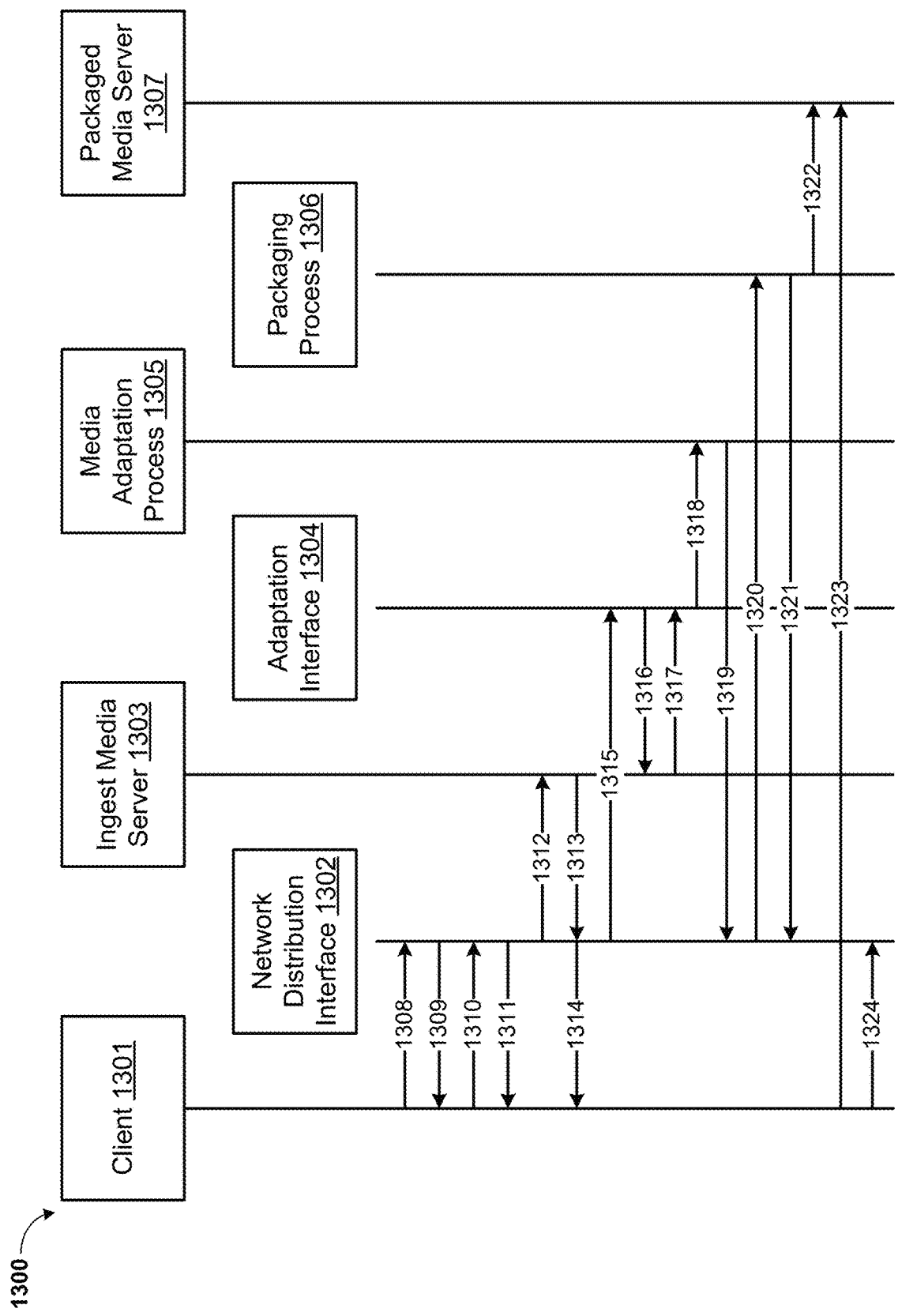
FIG. 13 is a sequence diagram of a network adapting a specific immersive media in an ingest format to a streamable and suitable distribution format for a specific immersive media client end-point.

The components and communications shown in FIG. 13 for sequence diagram 1300 are explained as follows: Client end-point 1301 initiates a Media Request 1308 to Network Distribution Interface 1302. The request 1308 includes information to identify the media that is requested by the client, either by URN or other standard nomenclature. The Network Distribution Interface 1302 responds to request 1308 with Profiles Request 1309, which requests that client 1301 provide information about its currently available resources (including compute, storage, percent battery charged, and other information to characterize the current operating status of the client). Profiles Request 1309 also requests that the client provide one or more neural network models that can be used by the network for neural network inferencing to extract or interpolate the correct media views to match the features of the client's presentation system, if such models are available at the client. Response 1311 from client 1301 to interface 1302 provides a client token, application token, and one or more neural network model tokens (if such neural network model tokens are available at the client). The interface 1302 then provides client 1301 with a Session ID token 1311. Interface 1302 then requests Ingest Media Server 1303 with Ingest Media Request 1312, which includes the URN or standard nomenclature name for the media identified in request 1308. Server 1303 replies to request 1312 with response 1313 which includes an ingest media token. Interface 1302 then provides the media token from response 1313 in a call 1314 to client 1301. Interface 1302 then initiates the adaptation process for the requested media in 1308 by providing the Adaptation Interface 1304 with the ingest media token, client token, application token, and neural network model tokens. Interface 1304 requests access to the ingest media by providing server 1303 with the ingest media token at call 1316 to request access to the ingest media assets. Server 1303 responds to request 1316 with an ingest media access token in response 1317 to interface 1304. Interface 1304 then requests that Media Adaptation Module 1305 adapt the ingest media located at the ingest media access token for the client, application, and neural network inference models corresponding to the session ID token created at 1313. Request 1318 from interface 1304 to module 1305 contains the required tokens and session ID. Module 1305 provides interface 1302 with adapted media access token and session ID in update 1319. Interface 1302 provides Packaging Module 1306 with adapted media access token and session ID in interface call 1320. Packaging module 1306 provides response 1321 to interface 1302 with the Packaged Media Access Token and Session ID in response 1321. Module 1306 provides packaged assets, URNS, and the Packaged Media Access Token for the Session ID to the Packaged Media Server 1307 in response 1322. Client 1301 executes Request 1323 to initiate the streaming of media assets corresponding to the Packaged Media Access Token received in message 1321. The client 1301 executes other requests and provides status updates in message 1324 to the interface 1302.

Figure 14:
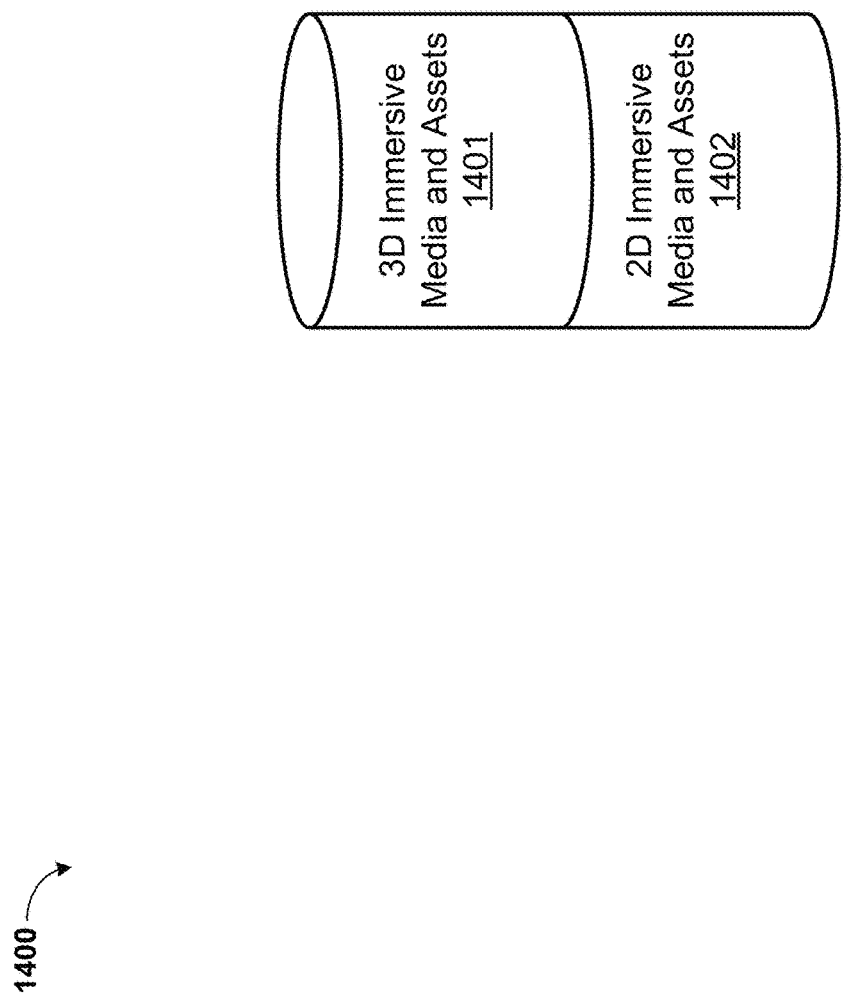
FIG. 14 is a schematic illustration of the Ingest Media Format and Assets 1002 of FIG. 10 consisting of both immersive and legacy content formats, i.e., 2D video format only, or both immersive and 2D video formats.

FIG. 14 depicts the ingest media format and assets 1002 of FIG. 10 as optionally consisting of two parts: Immersive Media and Assets in 3D Format 1401 and 2D Format 1402. The 2D Format 1402 may be a single view coded video stream, e.g., ISO/IEC 14496 Part 10 Advanced Video Coding, or it may be a coded video stream that contains multiple views, e.g., Multi-view Compression Amendment to ISO/IEC 14496 Part 10.

Figure 15:
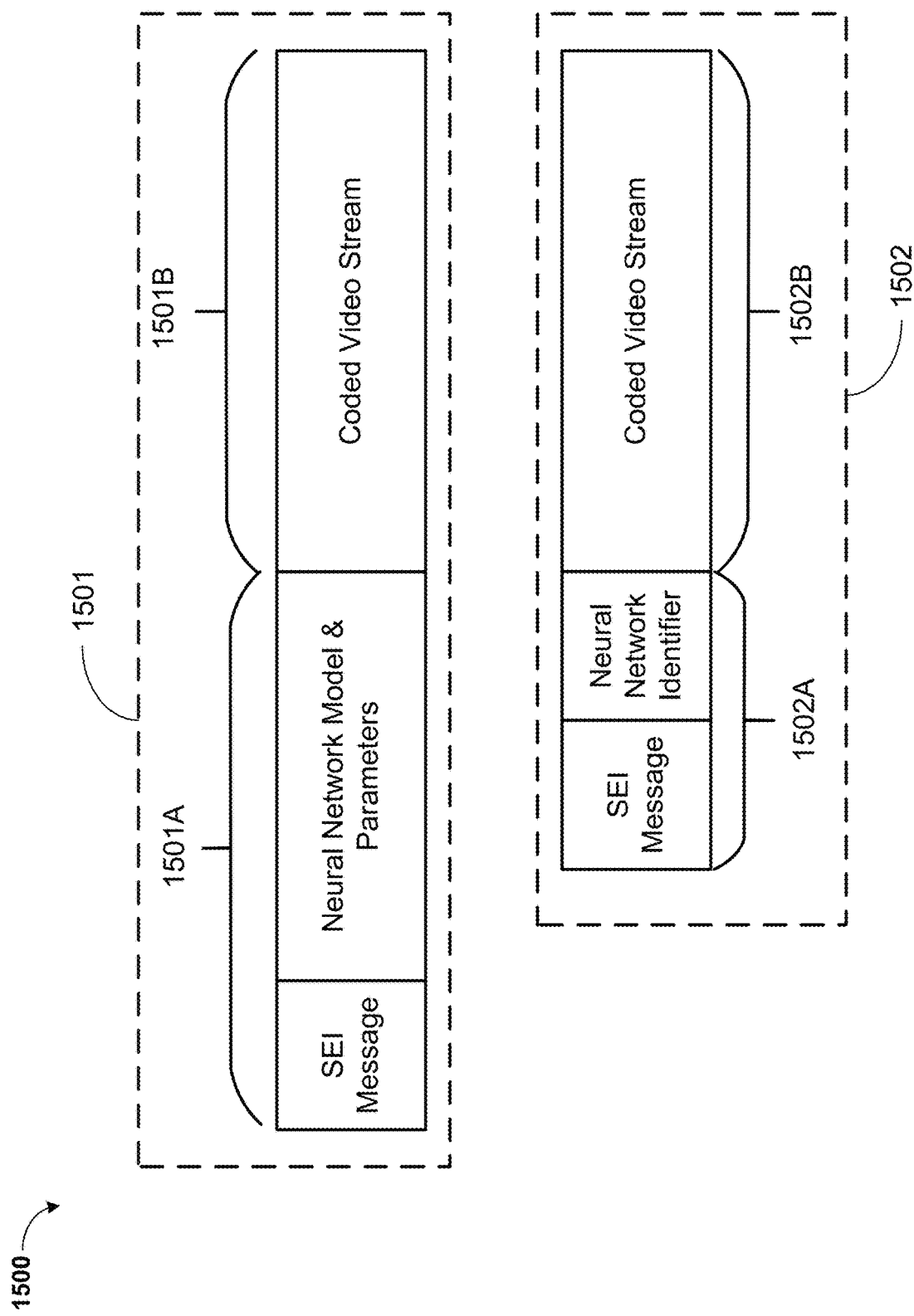
FIG. 15 depicts the carriage of neural network model information along with a coded video stream.

FIG. 15 depicts the carriage of neural network model information along with a coded video stream. In this figure, coded bitstream 1501 includes the neural network model and corresponding parameters directly carried by one or more SEI messages 1501A, along with coded video stream 1501B. Whereas in coded bitstream 1502, which includes one or more SEI messages 1502A and a coded video stream 1502B, the one or more SEI messages 1502A may carry an identifier for the neural network model and its corresponding parameters. In the scenario of coded bitstream 1502, the neural network model and parameters may be stored outside of the coded video stream, for example, in 1001A of FIG. 10.

Some embodiments may relate to a system, a method, and/or a computer readable medium at any possible technical detail level of integration. The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

The descriptions of the various aspects and embodiments have been presented for purposes of illustration, but are not intended to be exhaustive or limited to the embodiments disclosed. Even though combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of streaming immersive media, executable by a processor, the method comprising:
    ingesting content in a two-dimensional format, wherein the two-dimensional format references at least one neural network, wherein the ingested content includes a scene that includes a plurality of layers, wherein each layer of media objects that are referenced within a scene is associated with a token that points to an address where a resource is accessed within a network that ingests the content, wherein the plurality of layers comprises a base layer and an enhancement layer, wherein the enhancement layer modifies a property of a media object in the base layer such that the enhancement layer alters a surface or texture of the media object in the base layer from a first property to a second property;
    converting the ingested content to a three-dimensional format based on the referenced at least one neural network; and
    streaming the converted content to the client end-point.

2. The method of claim 1, wherein the at least one neural network comprises a scene-specific neural network corresponding to the scene included in the ingested content.

3. The method of claim 2, wherein the converting of the ingested content further comprises:
    inferring depth information about the scene using the scene-specific neural network; and
    adapting the ingested content into a scene-specific volumetric format associated with the scene.

4. The method of claim 2, wherein the at least one neural network is trained based on priors corresponding to objects within the scene.

5. The method of claim 2, wherein the at least one neural network is referenced in a supplemental enhancement information (SEI) message included in a coded video bitstream corresponding to the ingested content.

6. The method of claim 5, wherein a neural network model and at least one parameter corresponding to the at least one neural network is embedded directly in the SEI message.

7. The method of claim 5, wherein a location of a neural network model corresponding to at least one neural network is signaled in the SEI message.

8. The method of claim 1, wherein the token for each layer of the media objects comprises at least one uniform resource identifier (URI).

9. A device for streaming immersive media, the device comprising:
    at least one memory configured to store program code; and
    at least one processor configured to read the program code and operate as instructed by the program code, the program code including:
    ingesting code configured to cause the at least one processor to ingest content in a two-dimensional video format, wherein the two-dimensional format references at least one neural network, wherein the ingested content includes a scene that includes a plurality of layers, wherein each layer of media objects that are referenced within a scene is associated with a token that points to an address where a resource is accessed within a network that ingests the content, wherein the plurality of layers comprises a base layer and an enhancement layer, wherein the enhancement layer modifies a property of a media object in the base layer such that the enhancement layer alters a surface or texture of the media object in the base layer from a first property to a second property;
    converting code configured to cause the at least one processor to convert the ingested content to a three-dimensional video format based on the at least one neural network model such that the ingested content converted to a three-dimensional video format based on the referenced at least one neural network; and
    streaming code configured to cause the at least one processor to stream the converted content to the client end-point.

10. The device of claim 9, wherein the content comprises a scene-specific neural network corresponding to the scene included in the ingested content.

11. The device of claim 10, wherein the converting code comprises:
    inferring code configured to cause the at least one processor to infer depth information about the scene using the scene-specific neural network; and
    adapting code configured to cause the at least one processor to adapt the ingested content into a scene-specific volumetric format associated with the scene.

12. The device of claim 10, wherein the at least one neural network is trained based on priors corresponding to objects within the scene.

13. The device of claim 10, wherein the at least one neural network is referenced in a supplemental enhancement information (SEI) message included in a coded video bitstream corresponding to the ingested content.

14. The device of claim 13, wherein a neural network model and at least one parameter corresponding to the at least one neural network is embedded directly in the SEI message.

15. The device of claim 13, wherein a location of a neural network model corresponding to at least one neural network is signaled in at least one of the SEI message.

16. The device of claim 9, wherein the token for each layer of the media objects comprises at least one uniform resource identifier (URI).

17. A non-transitory computer-readable medium storing instructions, the instructions comprising: one or more instructions that, when executed by at least one processor of a device for streaming immersive media, cause the at least one processor to:
   ingest content in a two-dimensional video format, wherein the two-dimensional format references at least one neural network, wherein the ingested content includes a scene that includes a plurality of layers, wherein each layer of media objects that are referenced within a scene is associated with a token that points to an address where a resource is accessed within a network that ingests the content, wherein the plurality layers comprises a base layer and an enhancement layer, wherein the enhancement layer modifies a property of a media object in the base layer such that the enhancement layer alters a surface or texture of the media object in the base layer from a first property to a second property;
   convert the ingested content to a three-dimensional format based on the referenced at least one neural network; and
   stream the converted content to the client end-point.

18. The non-transitory computer-readable medium of claim 17, wherein the at least one neural network comprises a scene-specific neural network corresponding to the scene included in the ingested content.

19. The non-transitory computer-readable medium of claim 18, wherein the one or more instructions further cause the at least one processor to:
   infer depth information about the scene using the scene-specific neural network; and
   adapt the ingested content into scene-specific volumetric format associated with the scene.

20. The non-transitory computer-readable medium of claim 18, wherein the at least one neural network is referenced in a supplemental enhancement information (SEI) message included in the coded video bitstream corresponding to the ingested content.

\* \* \* \* \*